(12) United States Patent
Lee et al.

(10) Patent No.: US 11,172,450 B2
(45) Date of Patent: Nov. 9, 2021

(54) ELECTRONIC DEVICE AND METHOD FOR CONTROLLING OPERATION THEREOF

(71) Applicant: Samsung Electronics Co., Ltd., Gyeonggi-do (KR)

(72) Inventors: Taehan Lee, Seoul (KR); Sunggun Bae, Gyeonggi-do (KR); Sangil Park, Gyeongsangbuk-do (KR); Hyun-Cheol Park, Daegu (KR); Ikjoo Byun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 16/342,321

(22) PCT Filed: Sep. 21, 2017

(86) PCT No.: PCT/KR2017/010359
§ 371 (c)(1),
(2) Date: Apr. 16, 2019

(87) PCT Pub. No.: WO2018/080023
PCT Pub. Date: May 3, 2018

(65) Prior Publication Data
US 2020/0053651 A1   Feb. 13, 2020

(30) Foreign Application Priority Data

Oct. 26, 2016   (KR) ........................ 10-2016-0140073

(51) Int. Cl.
*H04B 1/38*   (2015.01)
*H04W 52/02*   (2009.01)
*H04W 88/02*   (2009.01)

(52) U.S. Cl.
CPC .... *H04W 52/0251* (2013.01); *H04W 52/0261* (2013.01); *H04M 2250/12* (2013.01); *H04W 88/02* (2013.01)

(58) Field of Classification Search
CPC ......... H04W 52/0251; H04W 52/0261; H04W 88/02; H04M 2250/12
(Continued)

(56) References Cited

U.S. PATENT DOCUMENTS 8,793,519 B2 * 7/2014 Hong .................... G06F 1/3203
713/320
2004/0073827 A1 * 4/2004 Tsirkel .................. G06F 1/3231
713/323

(Continued)

FOREIGN PATENT DOCUMENTS

KR    10-1488938 B1    2/2015
KR    10-1497181 B1    2/2015
(Continued)

*Primary Examiner* — April G Gonzales
(74) *Attorney, Agent, or Firm* — Cha & Reiter, LLC

(57) ABSTRACT

Various embodiments of the present disclosure relate to an electronic device including an environment sensor and a method for controlling an operation thereof. The electronic device may comprise: at least one environment sensor; and at least one processor functionally coupled to the at least one environment sensor and configured to control the at least one environment sensor to collect environment information at designated intervals, to recognize presence or absence of a user based on the collected environment information, and to control an operation of the electronic device according to the presence or absence of the user. Other various embodiments are possible.

16 Claims, 14 Drawing Sheets

(58) Field of Classification Search
USPC .......................................................... 455/574
See application file for complete search history.

(56) References Cited

U.S. PATENT DOCUMENTS

| | | | | |
|---|---|---|---|---|
| 2014/0289833 A1* | 9/2014 | Briceno | ................. | H04L 63/08 |
| | | | | 726/7 |
| 2015/0370226 A1* | 12/2015 | Kim | ................... | G05B 13/0205 |
| | | | | 700/49 |
| 2016/0061472 A1* | 3/2016 | Lee | ........................ | G05B 15/02 |
| | | | | 700/276 |
| 2016/0147278 A1* | 5/2016 | Yoon | ..................... | G06F 1/3265 |
| | | | | 713/323 |
| 2016/0150472 A1* | 5/2016 | Yoon | ..................... | G06F 1/3209 |
| | | | | 455/574 |
| 2017/0245106 A1* | 8/2017 | Connelly | .............. | H04L 65/602 |

FOREIGN PATENT DOCUMENTS

| | | |
|---|---|---|
| KR | 10-2015-0029041 A | 3/2015 |
| KR | 10-2015-0145860 A | 12/2015 |
| KR | 10-2016-0027923 A | 3/2016 |
| KR | 10-2016-0060968 A | 5/2016 |

\* cited by examiner

ELECTRONIC DEVICE AND METHOD FOR CONTROLLING OPERATION THEREOF

CLAIM OF PRIORITY

This application is a National Phase Entry of PCT International Application No. PCT/KR2017/010359, which was filed on Sep. 21, 2017, and claims a priority to Korean Patent Application No. 10-2016-0140073, which was filed on Oct. 26, 2016, the contents of which are incorporated herein by reference.

TECHNICAL FIELD

Various embodiments of the present disclosure relate to an electronic device including an environment sensor and a method for controlling an operation thereof.

BACKGROUND ART

Electronic devices (e.g., a mobile terminal, a smart phone, a wearable electronic device, etc.) may provide various functions. For example, a smart phone may provide, in addition to a basic voice communication function, an Internet access function, a music or video playback function, a photographing function, a navigation function, a messenger function, and so on.

The electronic devices may run a plurality of applications in a background. This may cause unnecessary current consumption. Further, the electronic device may provide an alarm in a preset manner if an event such as a missed call, an incoming message, a schedule and so on occur, regardless of whether a user is placed nearby.

DISCLOSURE OF INVENTION

Technical Problem

The electronic devices are subject to unnecessary current consumption by performing the alarm operation even if the user is not present (placed) nearby and is not capable of using (or identifying) the electronic device, and operating various applications in the background.

Various embodiments of the present disclosure for addressing the above-stated problems may recognize the presence or absence of the user using environment information collected through at least one environment sensor, and control operations of the electronic device based on the recognition result.

Further, the various embodiments of the present disclosure may minimize malfunction of the electronic device by additionally recognizing the presence or absence of the user using at least one other sensor (e.g., a camera, a microphone, etc.) than the environment sensor.

Solution to Problem

According to various embodiments of the present disclosure, an electronic device may include at least one environment sensor; and at least one processor functionally coupled to the at least one environment sensor and configured to control the at least one environment sensor to collect environment information at designated intervals, to recognize presence or absence of a user based on the collected environment information, and to control an operation of the electronic device according to the presence or absence of the user.

According to various embodiments of the present disclosure, a method for controlling an operation of an electronic device may include collecting environment information at designated intervals; recognizing presence or absence of a user based on the collected environment information; and controlling the operation of the electronic device according to the presence or absence of the user.

Advantageous Effects of Invention

Various embodiments of the present disclosure may recognize presence or absence of a user even if the user is not placed in a specific range (e.g., in an angle of view of a camera) according to recognizing the presence or the absence of the user using an environment sensor. In addition, the various embodiments of the present disclosure may minimize malfunction by recognizing the presence or the absence of the user through a combination of a plurality of environment sensors and/or a variety of other sensors.

BEST MODE FOR CARRYING OUT THE INVENTION

Figure 1:
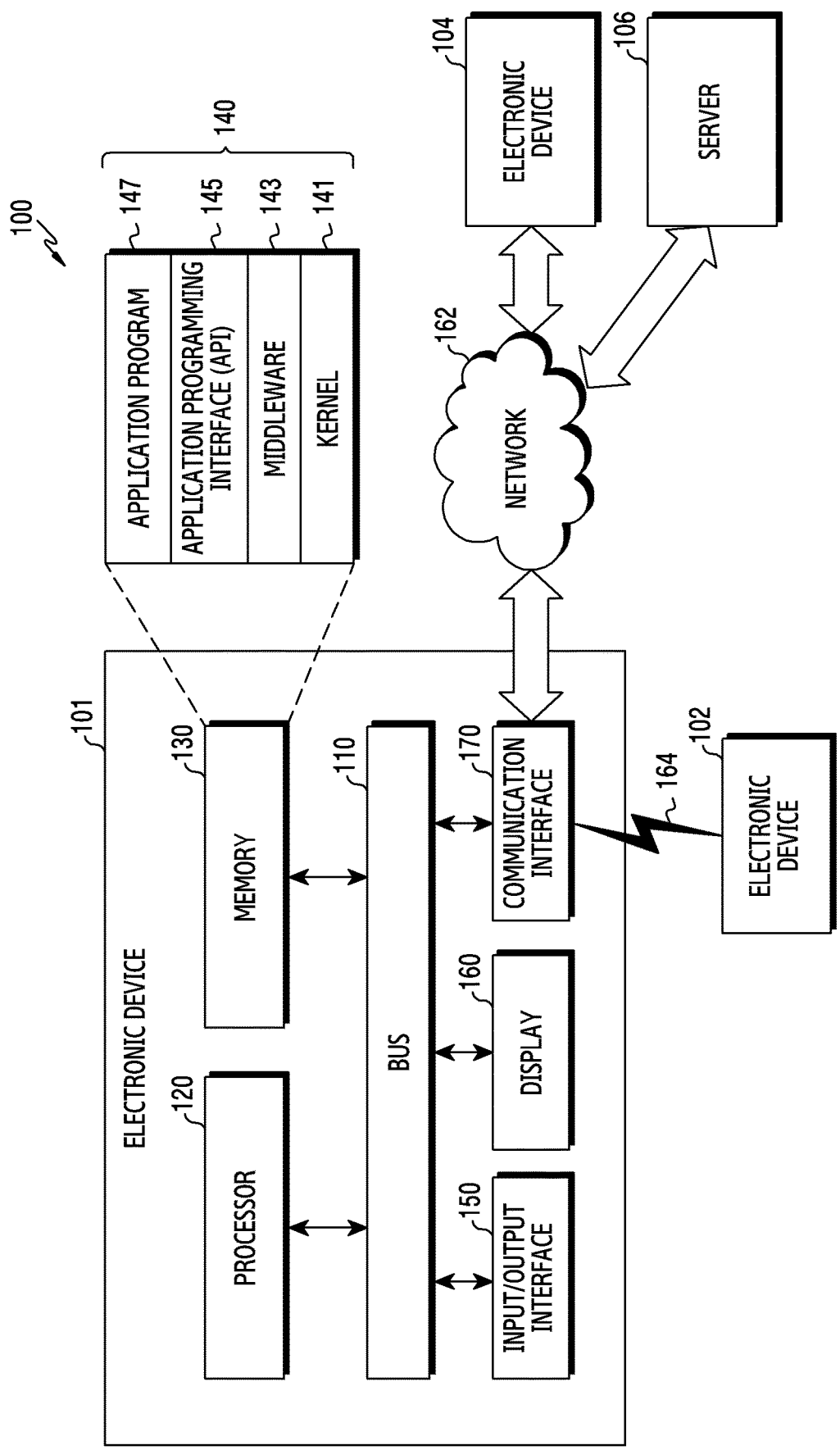
FIG. 1 is a diagram illustrating an electronic device in a network environment according to one embodiment of the present disclosure.

Various embodiments of the present disclosure are described in greater detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intention and usage. Therefore, the terms used herein should be understood based on the descriptions made herein. It is to be understood that the singular forms "a," "an," and "the" also include plural referents unless the context clearly dictates otherwise. In the present disclosure, an expression such as "A or B," "at least one of A and B" or "one or more of A and B" may include all possible combinations of the listed items. Expressions such as "first," "second," "primarily," or "secondary," as used herein, may represent various elements regardless of order and/or importance, and do not limit the corresponding elements. The expressions may be used for distinguishing one element from another element. When it is described that an element (such as a first element) is operatively or communicatively "coupled to" or "connected to" another element (such as a second element), the element may be directly connected to the other element or may be connected through another element (such as a third element).

The expression "configured (or set) to", as used in the present disclosure, may be used interchangeably with, for example, "suitable for," "having the capacity to," "designed to," "adapted to," "made to," or "capable of", according to the situation. The term "configured (or set) to" does not only refer to "specifically designed to" in hardware. Alternatively, in some situations, the expression "apparatus configured to" may refer to a situation in which the apparatus "may" operate together with another apparatus or component. The phrase "a processor configured (or set) to perform A, B, and C" may be a dedicated processor, a general-purpose processor (such as a central processing (CPU) or an application processor (AP)) that may perform a corresponding operation by executing at least one software program stored in a dedicated processor (such as an embedded processor) for performing a corresponding operation or in a memory device.

An electronic device, according to an embodiment of the present disclosure, may be for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, and the like, but is not limited thereto. The wearable device may include at least one of an accessory type (e.g., a watch, a ring, a bracelet, an ankle bracelet, a necklace, eyeglasses, a contact lens, or a head-mounted-device (HMD)), a fabric or clothing embedded type (e.g., electronic garments), a body attachable type (e.g., a skin pad or a tattoo), and an implantable circuit, and the like, but is not limited thereto. The electronic device may be at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box, an electronic dictionary, an electronic key, a camcorder, and an electronic frame, and the like, but is not limited thereto.

In an embodiment of the present disclosure, the electronic device may be at least one of various medical devices (such as, various portable medical measuring devices (a blood sugar level measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for a ship (such as, a navigation device for a ship and a gyro compass), avionics, a security device, a head unit for a vehicle, an industrial or home robot, a drone, an automated teller machine (ATM), a point of sales (POS) device, and an Internet of things (IoT) device (e.g., a light bulb, various sensors, a sprinkler device, a fire alarm, a thermostat, a street light, a toaster, sports equipment, a hot water tank, a heater, and a boiler), and the like, but is not limited thereto. According to an embodiment of the present disclosure, the electronic device may be at least one of a portion of furniture, building/construction or vehicle, an electronic board, an electronic signature receiving device, a projector, and various measuring devices (e.g., water supply, electricity, gas, or electric wave measuring device), and the like, but is not limited thereto. An electronic device may be a flexible electronic device or a combination of two or more of the foregoing various devices. An electronic device is not limited to the foregoing devices, and may be embodied as a newly developed electronic device. The term "user", as used herein, may refer to a person using an electronic device or a device using an electronic device (e.g., an artificial intelligence electronic device).

FIG. 1 is a block diagram of an electronic device in a network environment, according to an embodiment of the present disclosure.

Referring to FIG. 1, the network environment 100 may include the electronic device 101. The electronic device 101 includes a bus 110, a processor 120, a memory 130, an input/output interface 150, a display 160, and a communication interface 170. The electronic device 101 may be provided without at least one of the components, or may include at least one additional component. The bus 110 may include a circuit for connecting the components 120 through 170 and delivering communication signals (e.g., control messages or data) therebetween. The processor 120 may include one or more of a CPU, an AP, and a communication processor (CP). The processor 120, for example, may perform an operation or data processing with respect to control and/or communication of at least another component of the electronic device 101.

The memory 130 may include a volatile and/or nonvolatile memory. The memory 130, for example, may store commands or data relating to at least another component of the electronic device 101. According to an embodiment of the present disclosure, the memory 130 may store software and/or a program 140. The program 140 includes, for example, a kernel 141, middleware 143, an application programming interface (API) 145, and/or an application program (or applications) 147. At least part of the kernel 141, the middleware 143, or the API 145 may be referred to as an operating system (OS). The kernel 141 may control or manage system resources (e.g., the bus 110, the processor 120, or the memory 130) used for performing operations or functions implemented by the other programs (e.g., the middleware 143, the API 145, or the applications 147). Additionally, the kernel 141 may provide an interface for controlling or managing system resources by accessing an individual component of the electronic device 101 from the middleware 143, the API 145, or the applications 147.

The middleware 143, for example, may serve an intermediary role for exchanging data between the API 145 or the applications 147 and the kernel 141 through communication. Additionally, the middleware 143 may process one or more job requests received from the applications 147, based on their priority. The middleware 143 may assign a priority for using a system resource (e.g., the bus 110, the processor 120, or the memory 130) of the electronic device 101 to at least one of the applications 147, and process the one or more job requests. The API 145, as an interface through which the applications 147 controls a function provided from the kernel 141 or the middleware 143, may include, for example, at least one interface or function (e.g., an instruction) for file control, window control, image processing, or character control. The input/output interface 150, for example, may deliver commands or data input from a user or another external device to other component(s) of the electronic device 101, or output commands or data input from the other component(s) of the electronic device 101 to the user or another external device.

The display 160, for example, may include a liquid crystal display (LCD), a light emitting diode (LED) display, an organic light emitting diode (OLED) display, a microelectromechanical systems (MEMS) display, or an electronic paper display, and the like, but is not limited thereto. The display 160, for example, may display various content (e.g., texts, images, videos, icons, and/or symbols) to the user. The display 160 may include a touch screen, for example, and receive touch, gesture, proximity, or hovering inputs by using an electronic pen or a user's body part. The communication interface 170, for example, may set communications between the electronic device 101 and an external device (e.g., a first external electronic device 102, a second external electronic device 104, or a server 106. The communication interface 170 may communicate with the second external electronic device 104 or the server 106 over a network 162 through wireless communication or wired communication.

The wireless communication, for example, may include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication may include, for example, at least one of wireless fidelity (Wi-Fi), light fidelity (Li-Fi), Bluetooth™, Bluetooth™ low energy (BLE), Zigbee, near field communication (NFC), magnetic secure transmission, radio frequency (RF), and body area network (BAN). The wireless communication may include GNSS. The GNSS may include, for example, global positioning system (GPS), global navigation satellite system (GLONASS), Beidou navigation satellite system (Beidou), or Galileo (the European global satellite-based navigation system). Hereafter, the term GPS may be interchangeably used with the term GNSS. The wired communication, for example, may include at least one of universal serial bus (USB), high definition multimedia interface (HDMI), recommended standard 232 (RS-232), power line communications, and plain old telephone service (POTS). The network 162 may include a telecommunications network, for example, at least one of a computer network (e.g., LAN or WAN), the Internet, and a telephone network.

Each of the first and second external electronic devices 102 and 104 may be of the same type or of a different type from that of the electronic device 101. According to an embodiment of the present disclosure, all or part of operations executed in the electronic device 101 may be executed by another electronic device or a plurality of electronic devices (e.g., the electronic device 102 or 104, or the server 106). To perform a function or service automatically or by request, instead of performing the function or the service by the electronic device 101, the electronic device 101 may request at least part of a function relating thereto from the electronic device 102 or 104, or the server 106. The electronic device 102 or 104, or the server 106 may perform the requested function or an additional function and send its result to the electronic device 101. The electronic device 101 may provide the requested function or service by processing the received result. In doing so, for example, cloud computing, distributed computing, or client-server computing techniques may be used.

Figure 2:
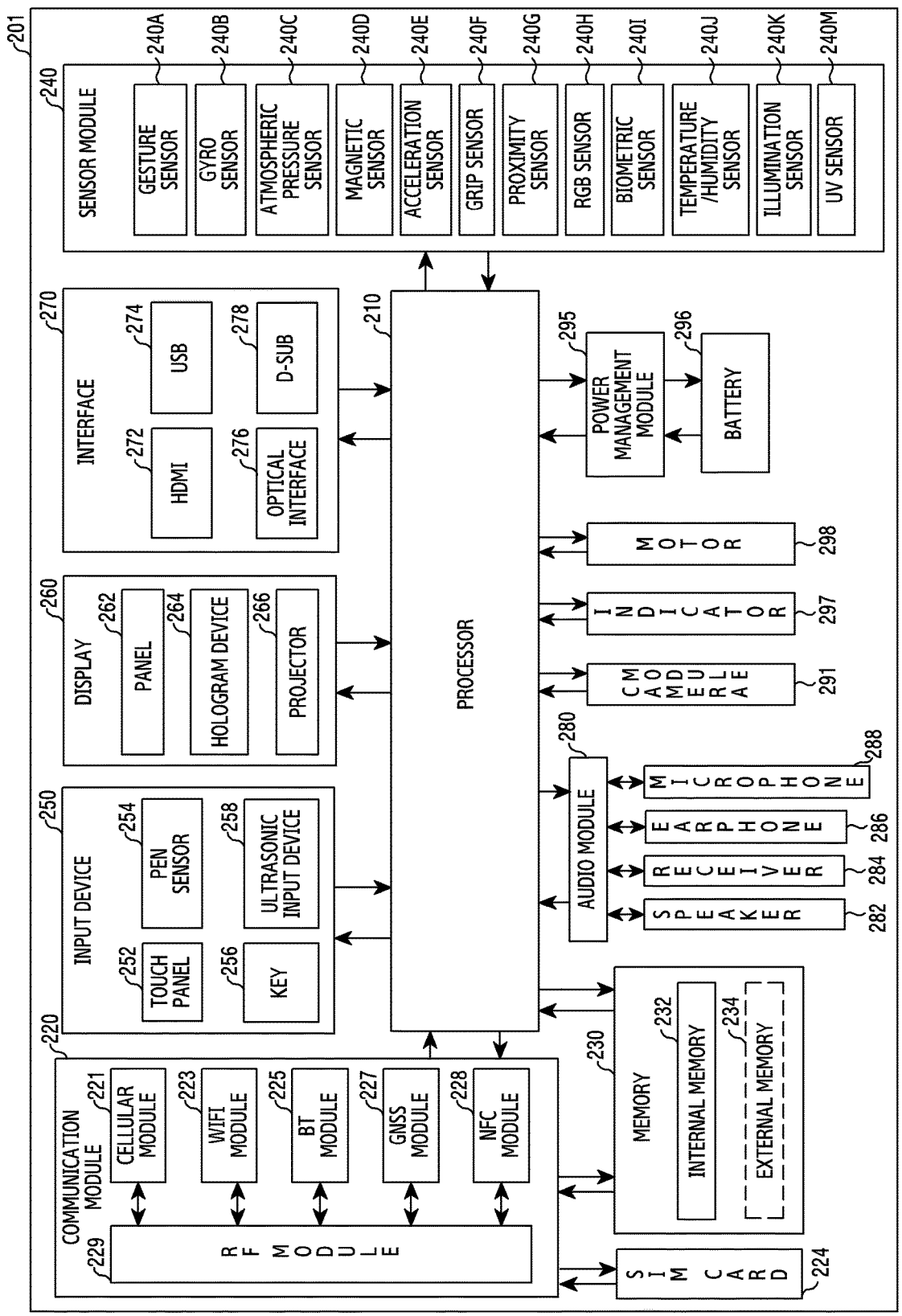
FIG. 2 is a block diagram of an electronic device according to one embodiment of the present disclosure.

FIG. 2 is a block diagram of an electronic device, according to an embodiment of the present disclosure. The electronic device 201, for example, may include all or part of the above-described electronic device 101 of FIG. 1. The electronic device 201 includes one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, may control a plurality of hardware or software components connected to the processor 210, and also may perform various data processing and operations by executing an OS or an application program. The processor 210 may be implemented with a system on chip (SoC), for example. The processor 210 may further include a graphic processing unit (GPU) and/or an image signal processor. The processor 210 may include at least part (e.g., a cellular module 221) of the components illustrated in FIG. 2. The processor 210 may load commands or data received from at least one other component (e.g., a nonvolatile memory) into a volatile memory, process the commands, and store various data in the nonvolatile memory.

The communication module 220 may have the same or similar configuration as the communication interface 170 of FIG. 1. The communication module 220 may include, such as, the cellular module 221, a Wi-Fi module 223, a Bluetooth™ (BT) module 225, a GNSS module 227, an NFC module 228, and an RF module 229. The cellular module 221, for example, may provide voice call, video call, short message service (SMS), or Internet service through a communication network. The cellular module 221 may identify and authenticate the electronic device 201 in a communication network by using the SIM 224. The cellular module 221 may perform at least part of a function that the processor 210 provides. The cellular module 221 may further include a CP. At least some (e.g., two or more) of the cellular module 221, the Wi-Fi module 223, the BT module 225, the GNSS module 227, and the NFC module 228 may be included in one integrated circuit (IC) or an IC package. The RF module 229, for example, may transmit/receive a communication signal (e.g., an RF signal). The RF module 229, for example, may include a transceiver, a power amp module (PAM), a frequency filter, a low noise amplifier (LNA), or an antenna. At least one of the cellular module 221, the Wi-Fi module 223, the BT module 225, the GNSS module 227, and the NFC module 228 may transmit/receive an RF signal through an additional RF module. The SIM 224, for example, may include a card or an embedded SIM, and also may contain unique identification information (e.g., an integrated circuit card identifier (ICCID)) or subscriber information (e.g., an international mobile subscriber identity (IMSI)).

The memory 230 (e.g., the memory 130) may include at least one of an internal memory 232 or an external memory 234. The internal memory 232 may include at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 234 may include flash drive, for example, compact flash (CF), secure digital (SD), micro SD, mini SD, extreme digital (xD), multi-media card (MMC), or memory stick. The external memory 234 may be functionally or physically connected to the electronic device 201 through various interfaces.

The sensor module 240 may, for example, measure physical quantities or detect an operating state of the electronic device 201, and convert the measured or detected information into electrical signals. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor). The sensor module 240 may also include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor therein. The electronic device, as part of the processor 210 or individually, may further include a processor configured to control the sensor module 240 and control the sensor module 240 while the processor 210 is sleeping.

The input device 250, for example, may include at least one of a touch panel 252, a (digital) pen sensor 254, a key 256, and an ultrasonic input device 258. The touch panel 252 may use at least one of, for example, capacitive, resistive, infrared, and ultrasonic methods. Additionally, the touch panel 252 may further include a control circuit. The touch panel 252 may further include a tactile layer to provide a tactile response to a user. The (digital) pen sensor 254 may include, for example, part of a touch panel or a sheet for recognition. The key 256 may include, for example, a physical button, a touch key, an optical key, or a keypad. The ultrasonic input device 258 may detect ultrasonic waves from a microphone 288 and check data corresponding to the detected ultrasonic waves.

The display 260 (e.g., the display 160) may include at least one of a panel 262, a hologram device 264, a projector 266, and/or a control circuit for controlling them. The panel 262 may be flexible, transparent, or wearable, for example. The panel 262 and the touch panel 252 may be configured with one or more modules. The panel 262 may include a pressure sensor (or a force sensor) for measuring a pressure of the user touch. The pressure sensor may be integrated with the touch panel 252, or include one or more sensors separately from the touch panel 252. The hologram device 264 may show three-dimensional images in the air by using the interference of light. The projector 266 may display an image by projecting light on a screen. The screen, for example, may be placed inside or outside the electronic device 201. The interface 270, for example, may include an HDMI 272, a USB 274, an optical interface 276, or a D-subminiature (D-sub) 278. The interface 270 may be included in, for example, the communication interface 170 of FIG. 1. Additionally or alternately, the interface 270 may include a mobile high-definition link (MHL) interface, a SD card/MMC interface, or an infrared data association (IrDA) standard interface.

The audio module 280, for example, may convert sounds into electrical signals and convert electrical signals into sounds. At least some components of the audio module 280 may be included in, for example the input/output interface 150 of FIG. 1. The audio module 280 may process sound information input or output through a speaker 282, a receiver 284, an earphone 286, or the microphone 288. The camera module 291, as a device for capturing still images and videos, may include one or more image sensors (e.g., a front sensor or a rear sensor), a lens, an image signal processor (ISP), or a flash (e.g., an LED or a xenon lamp). The power management module 295, for example, may manage the power of the electronic device 201. According to an embodiment of the present disclosure, the power management module 295 may include a power management IC (PMIC), a charger IC, or a battery gauge, for example. The PMIC may have a wired and/or wireless charging method. The wireless charging method may include, for example, a magnetic resonance method, a magnetic induction method, or an electromagnetic method, and may further include an additional circuit for wireless charging, for example, a coil loop, a resonant circuit, or a rectifier circuit. The battery gauge may measure the remaining charge capacity of the battery 296, or a voltage, current, or temperature of the battery 296 during charging. The battery 296 may include, for example, a rechargeable battery and/or a solar battery.

The indicator 297 may display a specific state of the electronic device 201 or part thereof (e.g., the processor 210), for example, a booting state, a message state, or a charging state. The motor 298 may convert electrical signals into a mechanical vibration and generate a vibration or haptic effect. The electronic device 201 may include a mobile TV supporting device (e.g., a GPU) for processing media data according to standards such as digital multimedia broadcasting (DMB), digital video broadcasting (DVB), or MediaFlo™. Each of the above-described components of the electronic device may be configured with at least one component and the name of a corresponding component may vary according to the kind of electronic device. According to an embodiment of the present disclosure, the electronic device 201 may be configured to include at least one of the above-described components or an additional component, or to not include some of the above-described components. Additionally, some of components in an electronic device are configured as one entity, so that functions of previous corresponding components are performed identically.

Figure 3:
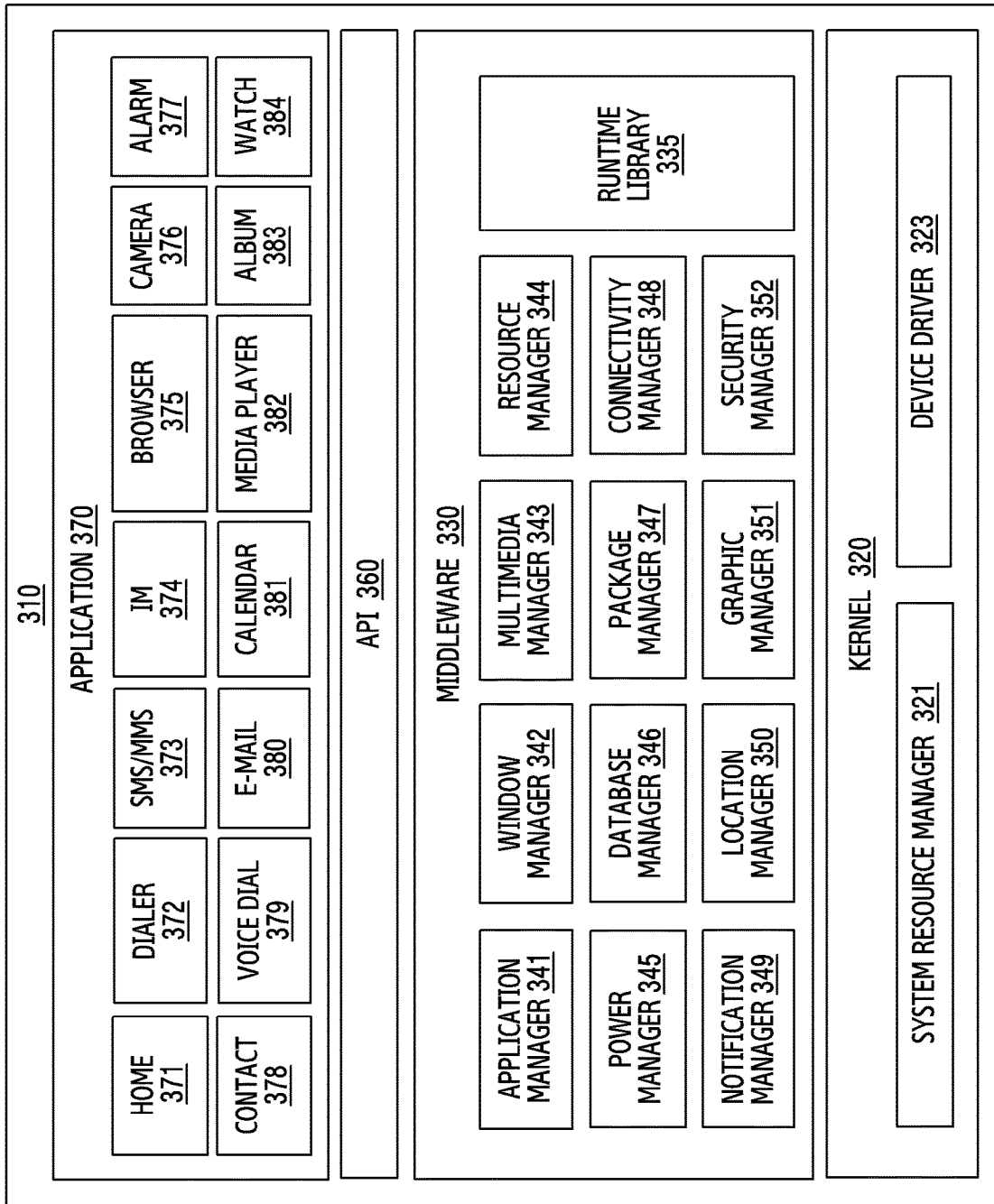
FIG. 3 is a block diagram of a program module according to one embodiment of the present disclosure.

FIG. 3 is a block diagram of a program module, according to an embodiment of the present disclosure. A program module 310 (e.g., the program 140) may include an OS for controlling a resource relating to the electronic device 101 and/or the applications 147 running on the OS. The OS may include, for example, Android™, iOS™, Windows™, Symbian™, Tizen™, or Bada™. Referring to FIG. 3, the program module 310 includes a kernel 320 (e.g., the kernel 141), a middleware 330 (e.g., the middleware 143), an API 360 (e.g., the API 145), and/or an application 370 (e.g., the applications 147). At least part of the program module 310 may be preloaded on an electronic device or may be downloaded from an external electronic device (e.g., the first external electronic device 102, the second external electronic device 104, or the server 106).

The kernel 320 includes, for example, at least one of a system resource manager 321 and/or a device driver 323. The system resource manager 321 may control, allocate, or retrieve a system resource. According to an embodiment of the present disclosure, the system resource manager 321 may include a process management unit, a memory management unit, or a file system management unit. The device driver 323 may include, for example, a display driver, a camera driver, a Bluetooth™ driver, a shared memory driver, a USB driver, a keypad driver, a Wi-Fi driver, an audio driver, or an inter-process communication (IPC) driver. The middleware 330, for example, may provide a function commonly required by the application 370, or may provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is running. The runtime library 335 may manage input/output, manage memory, or arithmetic function processing. The application manager 341, for example, may manage the life cycle of the applications 370. The window manager 342 may manage a GUI resource used in a screen. The multimedia manager 343 may recognize a format for playing various media files and encode or decode a media file by using the codec in a corresponding format. The resource manager 344 may manage a source code of the application 3740 or a memory space. The power manager 345 may manage the capacity, temperature, and/or power of the battery, and determine or provide power information for an operation of the electronic device using corresponding information among the capacity, temperature, and/or power of the battery. The power manager 345 may operate together with a basic input/output system (BIOS). The database manager 346 may create, search, or modify a database used in the application 370. The package manager 347 may manage installation or updating of an application distributed in a package file format.

The connectivity manager 348 may manage, for example, a wireless connection. The notification manager 349 may provide an event, such as incoming messages, appointments, and proximity alerts, to the user. The location manager 350 may manage location information of an electronic device. The graphic manager 351 may manage a graphic effect to be provided to the user or a user interface relating thereto. The security manager 352 may provide, for example, system security or user authentication. The middleware 330 may include a telephony manager for managing a voice or video call function of the electronic device, or a middleware module for combining various functions of the above-described components. The middleware 330 may provide a module specialized for each type of OS. The middleware 330 may dynamically delete part of the existing components or add new components. The API 360, as a set of API programming functions, may be provided as another configuration according to the OS. For example, Android or iOS may provide one API set for each platform, and Tizen may provide two or more API sets for each platform.

The application 370 includes at least one of a home 371, a dialer 372, an SMS/multimedia messaging system (MMS) 373, an instant message (IM) 374, a browser 375, a camera 376, an alarm 377, a contact 378, a voice dial 379, an e-mail 380, a calendar 381, a media player 382, an album 383, a clock 384. Additionally, the application 370 may include health care (e.g., measure an exercise amount or blood sugar level), or environmental information (e.g., air pressure, humidity, or temperature information) application. The application 370 may include an information exchange application for supporting information exchange between the electronic device and an external electronic device. The information exchange application may include, for example, a notification relay application for relaying specific information to the external device or a device management application for managing the external electronic device. The notification relay application may relay notification information from another application of the electronic device to an external electronic device, or receive and forward notification information from an external electronic device to the user. The device management application, for example, may install, delete, or update a function (e.g., turn-on/turn off of the external electronic device itself (or some components) or display brightness (or resolution) adjustment) of an external electronic device communicating with the electronic device, or an application operating in the external electronic device. The application 370 may include a specific application (e.g., a health care application of a mobile medical device) according to a property of the external electronic device. The application 370 may include an application received from an external electronic device. At least part of the program module 310 may be implemented (e.g., executed) with software, firmware, hardware (e.g., the processor 210), or a combination of at least two of them, and include a module, a program, a routine, a set of instructions, or a process for executing one or more functions.

Figure 4:
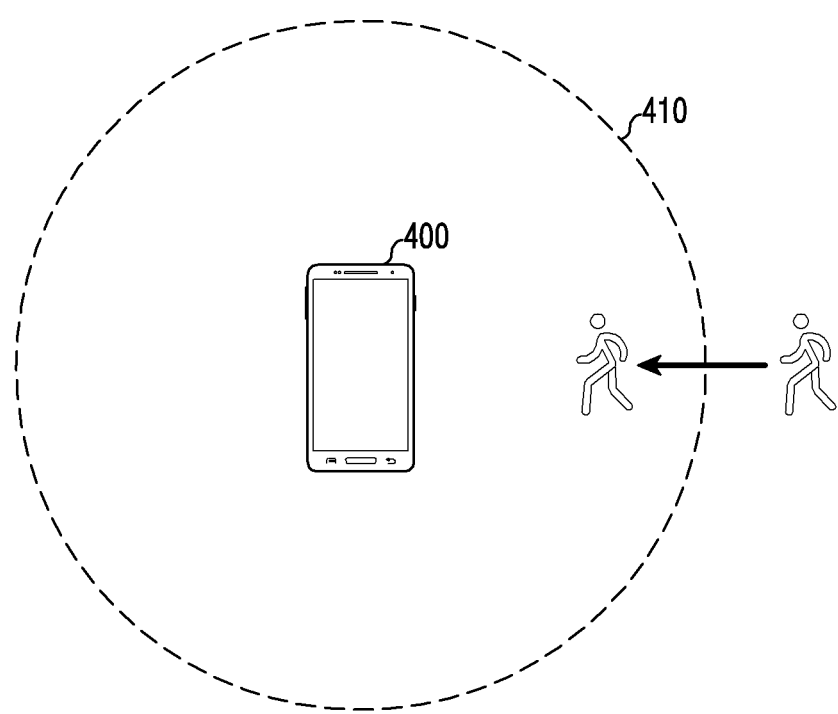
FIG. 4 is a diagram for illustrating an operation method of an electronic device according to one embodiment of the present disclosure.

FIG. 4 is a diagram for illustrating an operation method of an electronic device according to one embodiment of the present disclosure.

Referring to FIG. 4, an electronic device 400 according to one embodiment of the present disclosure may identify whether a user is present within a specific range 410. For example, the electronic device 400 may identity presence or absence of the user using an environment sensor (e.g., a temperature sensor, a humidity sensor, a wind speed sensor, an odour sensor, a gas sensor, etc.). For example, if environment information collected through the environment sensor exceeds a preset reference value (a first reference value) or a change of the environment information exceeds a preset reference value (a second reference value), the electronic device 400 may change a status value indicating the presence or absence of the user. For example, the electronic device 400 may change the status value to the absence of the user if the user was present, and change the status value to the presence of the user if the user was absent. Meanwhile, detailed descriptions on the method for identifying the presence or the absence of the user using the environment sensor will be explained later.

The specific range 410 may be a size of about 10 through 200 cm. For example, the specific range may be set to a circle of a radius 80 cm based on the electronic device 400. However, embodiments of the present disclosure are not limited to this, and the specific range may be variously set.

The electronic device 400 may enter an absence mode if the user is not present in the specific range 410. The absence mode is a mode which blocks an unnecessary operation of the electronic device 400 because the user may not identify the electronic device 400. For example, the electronic device 400 may control not to perform a visual notification (e.g., a popup window display, LED on/off, etc.) of an incoming message, a missed call, and so on in the absence mode. In another embodiment, the electronic device 400 may turn off always on display (AOD). In another embodiment, the electronic device 400 may terminate an application running in a background. In another embodiment, if terminating a multimedia (e.g., video) playback application, the electronic device 400 may save a playback time and then terminate.

If the user is present within the specific range 410, the electronic device 400 may enter a use ready mode (or an alarm provision mode). The use ready mode, where the user may be able to identify the electronic device 400, is a mode which alarms the blocked information (e.g., the information received in the absence mode but not notified) and prepares an operation of the electronic device 400. For example, the electronic device 400 may visually and/or audibly alarm (e.g., display a popup window, turn on/off the light emitted diode, output a sound effect, etc.) incoming message information blocked in the absence mode, missed call information blocked in the absence mode, new incoming message information, and/or new missed call information. The electronic device 400 may remove the alarm information if the user identifies the alarm. By contrast, if the use does not identify the alarm but re-enters the absence mode, the electronic device 400 may accumulate and store the alarm information not identified by the user with the new incoming message information or the new missed call information.

According to an embodiment, if entering the use ready mode, the electronic device 400 may turn on the AOD. According to another embodiment, if entering the use ready mode, the electronic device 400 may restore (re-execute in the background) applications running in the background before entering the absence mode. In another embodiment, if entering the use ready mode, the electronic device 400 may replay multimedia (video) from the stored playback time when entering the absence mode.

According to an embodiment, if entering the use ready mode, the electronic device 400 may execute an application (e.g., camera recording, voice recording, date/time display, weather information display, environment information display, schedule display, etc.) which is set by the user.

According to an embodiment, the electronic device 400 may identify an operating state of the electronic device 400 before collecting the environment information, and determine whether to collect the environment information according to the operating state. For example, if the display is turned on, a touch input is detected, a user's grip is detected through a grip sensor, or the audio module is operating (e.g., music play), the electronic device 400 may recognize that the user is present in the specific range. In another embodiment, if detecting movement or shaking of the electronic device 400 through an inertial sensor (e.g., an acceleration sensor, gyro sensor, etc), the electronic device 400 may recognize that the electronic device 400 is being used, that is, the user is present.

If recognizing no user presence based on the operating state of the electronic device 400, the electronic device 400 may perform an operation for identifying whether the user is present using the environment sensor. By contrast, if recognizing the user presence based on the operating state of the electronic device 400, the electronic device 400 may perform as in the related art, without identifying whether the user is present using the environment sensor. Its detailed descriptions will be explained later with reference to FIG. 7.

According to an embodiment, if entering the absence mode, the electronic device 400 may identify whether it is connected to at least one other electronic device (e.g., a tablet, a wearable electronic device, a smart TV, etc.) in a wired or wireless manner. If connecting to the other electronic device, the electronic device 400 may enter a quasi absence mode. By contrast, if connecting to the other electric device but not performing any operation over a specific time or if not connecting to the other electronic device, the electronic device 400 may enter the absence mode. Its detailed description will be explained later with reference to FIG. 8.

According to an embodiment, if the state value indicating the presence or absence of the user changes, the electronic device 400 may re-recognize whether or not the user is present through at least one other sensor (e.g., an inertial sensor, an optical sensor, an image sensor, etc.) For example, the electronic device 400 may re-recognize whether or not the user is present through an optical sensor (e.g., an infrared sensor, a proximity sensor, a gesture sensor, a heart rate sensor, etc.). In another embodiment, the electronic device 400 may re-recognize whether or not the user is present through an image sensor (e.g., a camera). In yet another embodiment, the electronic device 400 may re-recognize whether or not the user is present through a microphone. For example, the electronic device 400 may re-recognize whether the user is present by detecting footstep sound, voice, and the like through the microphone.

As such, various embodiments of the present disclosure may minimize malfunction of the electronic device 400 by recognizing the presence of the user through the environment sensor and then re-recognizing the user's presence through the other sensor. Its detailed descriptions will be explained later with reference to FIG. 9A through FIG. 9C.

Meanwhile, while the single specific range is shown in FIG. 4, a plurality of the specific ranges may be set according to an embodiment. At this time, the configuration for blocking the power and/or the terminated functions may vary for each range.

Figure 5:
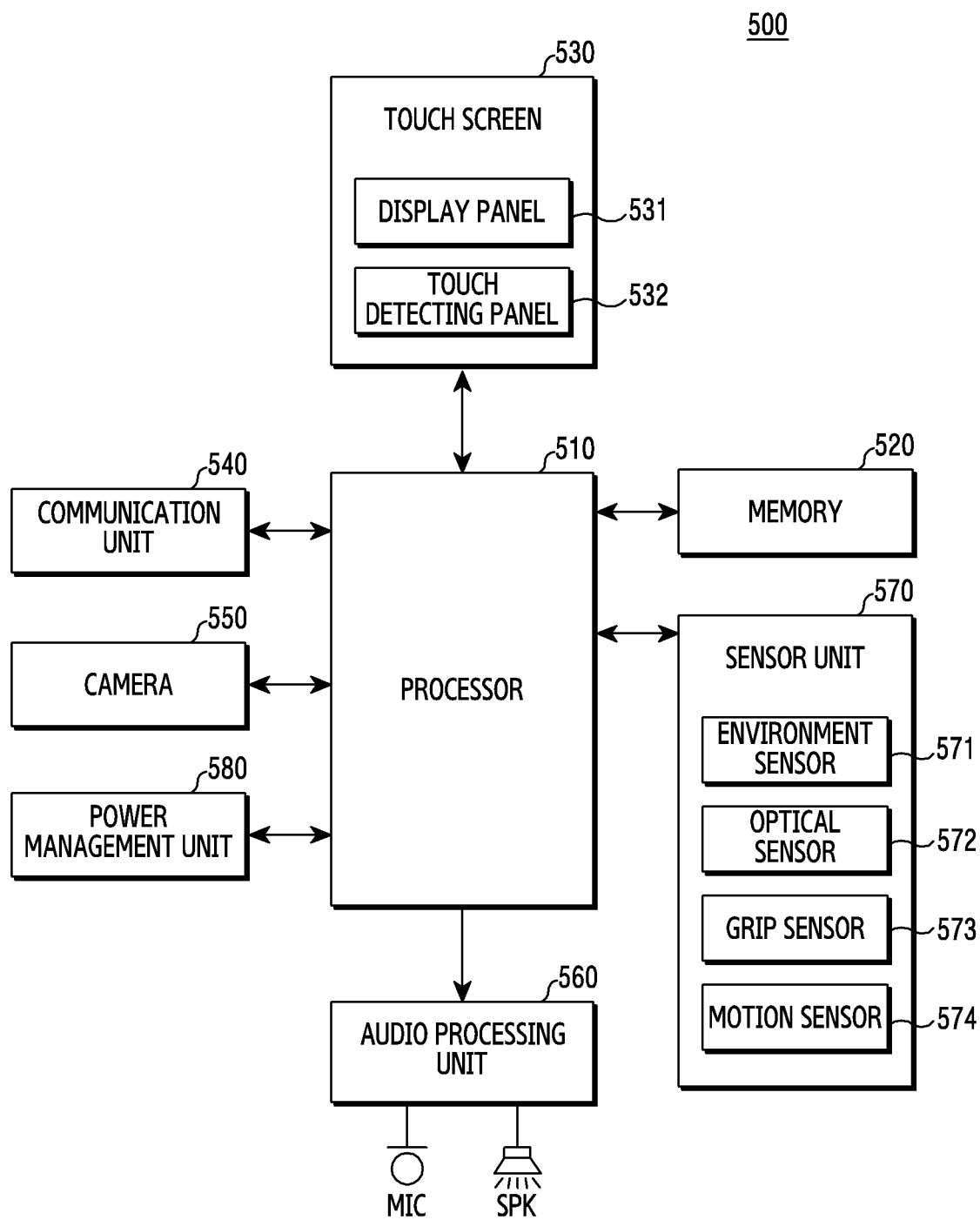
FIG. 5 is a block diagram illustrating a configuration of an electronic device according to one embodiment of the present disclosure.

FIG. 5 is a block diagram illustrating a configuration of an electronic device according to one embodiment of the present disclosure.

Referring to FIG. 5, an electronic device 500 (e.g., the electronic device 101 of FIG. 1, the electronic device 201 of FIG. 2, the electronic device 400 of FIG. 4) according to one embodiment may include a processor 510, a memory 520, a touch screen 530, a communication unit 540, a camera 550, an audio processing unit 560, a sensor unit 570, and a power management unit 580.

The processor 510 (e.g., the processor 120 of the electronic device 101 of FIG. 1, the processor 210 of the electronic device 201 of FIG. 2) may control the overall operation of the electronic device 500. In other words, the processor 510 may control the components of the electronic device 500. For example, the processor 510 may perform various functions by receiving instructions from the memory 520 and controlling the components according to the received instructions.

The processor 510 may include a CPU, an AP, a micro control unit (MCU), and so on. The processor 510 may include a single core processor or a multi-core processor. In another embodiment, the processor 510 may be a multi-processor including a plurality of processors. For example, the processor 510 may include an AP and a CP. In another embodiment, the processor 510 may include an application processor and a low power processor. For example, the application processor may control the overall operation of the electronic device, and the low power processor may be driven if entering the absence mode to control the sensor unit 570. In yet another embodiment, the low power processor may be configured separately, rather than inside the processor 510. In still another embodiment, the processor 510 may be driven in a normal mode or a low power mode, and may be driven in the low power mode if entering the absence mode.

According to various embodiments, the processor 510 may collect environment information at designated intervals, and control the operation of the electronic device 500 based on the collected environment information. According to various embodiments, the processor 510 may identify whether or not the user is present (or whether the presence or absence state changes) near the electronic device 500 by using (or analyzing) the collected environment information. For example, the processor 510 may recognize that the user is present if concentration of carbon dioxide increases. In another embodiment, the processor 510 may compare environment information of a previous interval with environment information currently measured, and if the environment information changes over a threshold, recognize that the status of the user presence is changed.

According to the identifying result, the operation of the electronic device 500 may be controlled. For example, if the user is present, the processor 510 may enter the use ready mode. By contrast, if the use is not present, the processor 510 may enter the absence mode.

The absence mode is a mode which blocks (off) the power of any other configuration than the configuration (an element, a sensor, a component, etc.) for collecting the change of surrounding environment information, and terminates any other function or application than the function or the application for collecting the change of surrounding environment information, according to recognizing that the user is not present near the electronic device 500. For example, the processor 510 may not provide visual, audible, or tactile alarms (e.g., display a popup window, flicker LED, output a sound effect, output vibrations, etc.) for an event (e.g., an alarm event such as an incoming message, a missed call, a schedule, etc.) occurring in the absence mode. In other embodiment, the processor 510 may terminate a running application, terminate an application running in the background, or turn off the AOD. In other embodiment, the processor 510 may perform at least one or more of the above-mentioned operations.

The use ready mode is a mode which visually, audibly, and/or tactually provides the alarm as in the related art if the event occurs, according to the user located near the electronic device 500. According to another embodiment, the processor 510 may re-supply the blocked power, restore the state of the stopped or terminated applications to the previous state, or turn on the AOD. In other embodiment, the processor 510 may perform at least one or more of the above-mentioned operations.

According to an embodiment, the processor 510 may identify whether the electronic device is used based on the operating status of the electronic device 500, and identify whether the user is present through the environment sensor if the electronic device is not used.

According to an embodiment, the processor 510 may identify the presence or absence of the user using the environment information and at least one other sensor. For example, if detecting the user's presence through the environment sensor, the processor 510 may re-identify the presence or absence of the user through the inertial sensor, the optical sensor, the image sensor, and so on, and control the operation of the electronic device 500 according to results of identifying and re-identifying the presence or absence of the user. Its detailed descriptions on the processor 510 will be explained by referring to FIG. 6A through FIG. 9C.

The memory 520 (e.g., the memory 130 of the electronic device 101 of FIG. 1, the memory 230 of the electronic device 201 of FIG. 1) may store various programs for operating the electronic device 500 and store data occurring or data downloaded during executions of the various programs. In addition, the memory 520 may store various commands and/or instructions for operating the processor 510. The memory 520 may include at least one of an internal memory or an external memory.

According to various embodiments, the memory 520 may store a program which identifies whether the presence or the absence of the user using the environment sensor and controls the operation of the electronic device 500. The program may include a routine for periodically collecting the environment information by using the environment sensor, a routine for recognizing the presence or the absence of the user using the collected environment information, a routine for controlling the operation of the electronic device 500 according to the presence or the absence of the user, a routine for determining whether the electronic device is used, a routine for determine whether to interwork with other electronic device, a routine for recognizing the presence or the absence of the user using at least one other sensor, and so on.

The memory 520 may store the collected environment information for a specific time duration. The memory 520 may organize and store missed call information received in the absence mode, incoming message information, schedule alarm information, or the like. In addition, if entering the absence mode during video playback, the memory 520 may store playback time information of the video and store information of applications running in the background. The playback time information and the information of the applications stored in the memory 520 may be used in the use ready mode. For example, if entering the use ready mode, the processor 510 may play the video from the stored playback time and execute applications corresponding to the stored information of the applications in the background.

The touch screen 530 (e.g., the display 160 of the electronic device 101 of FIG. 1, the display 260 of the electronic device 201 of FIG. 2) may provide an input function and an output function. For doing so, the touch screen 530 may include a touch detecting panel 532 and a display panel 531.

The display panel 531 may provide the output function. The display panel 531 may be formed as, for example, an LCD, an LED display, an OLED display, or a MEMS display, or an electronic paper display. The display panel 531 may be implemented to be flexible, transparent, or wearable.

The display panel 531 may display, for example, various contents (e.g., texts, images, videos, icons, and/or symbols). The display panel 531 according to various embodiments may stay in the off state even if the alarm event occurs in the absence mode. The display panel 531 may visually display the alarm information in the use ready mode. For example, the display panel 531 may display the alarm information in the form of a popup window.

The display panel 531 may be the AOD. In other embodiment, the display panel 531 may separately include the AOD. According to one embodiment of the present disclosure, AOD may be turned off in the absence mode and may be turned on in the use ready mode.

The touch detecting panel 532 may provide the input function. For example, the touch detecting panel 532 may detect (or recognize) a change of physical characteristics (e.g., capacitance, frequency, etc.) due to various touch inputs (e.g., tap, double-tap, touch, touch movement, multitouch, force touch, etc.) using an input tool such as a finger, a stylus, a digital pen, and so on, and forward it to the processor 510. The touch detecting panel 532 may include a first panel (not shown) for detecting the touch using the finger, a second panel (not shown) for recognizing the digital pen, and a third panel (not shown) for detecting the pressure.

The communication unit 540 (e.g., the communication module 170 of the electronic device 101 of FIG. 1, the communication module 220 of the electronic device 201 of FIG. 2) may perform a communication function. The communication unit 540 may perform the communication by wire or wirelessly. For example, the communication unit 540 may include a USB communication module, an ear jack communication module, a WiFi communication module, a Bluetooth (BT) communication module, an NFC module, a GPS module, and so on. According to one embodiment, at least some (e.g., two or more) of the WiFi communication module, the BT communication module, the NFC module, or the GPS module may be included in a single integrated chip (IC) or IC package.

According to various embodiments, the communication unit 540 may connect a communication channel with at least one other electric device (a tablet, a wearable electronic device, a smart TV, etc.). If connecting to the other electronic device, the communication unit 540 may not be turned off in the absence mode. In another embodiment, the communication unit 540 may receive environment information from the other electronic device. In this case, based on the environment information received from the other electronic device, the processor 510 may recognize whether the user is present near the other electronic device, and if the user is present near the other electronic device, may transmit information (e.g., alarm information) requiring user's confirmation to the other electronic device.

The camera 550 may capture a subject. The camera 550 may include a complementary metal-oxide semiconductor (CMOS) image sensor, a charge coupled device (CCD) image sensor. The camera 550 may include a front face camera (not shown) disposed in a front side of the electronic device 500 and a back face camera (not shown) disposed in a back side.

If recognizing the user's presence through the environment sensor 571, the camera 550 according to one embodiment of the present disclosure may be turned on to re-recognize the presence or the absence of the user. For example, if the front side of the electronic device 500 faces upwards, the processor 510 may capture the subject by turning on the front face camera, and identify whether the subject is a person. On the other hand, if the back side of the electronic device 500 faces upwards, the processor 510 may capture the subject by turning on the back face camera, and identify whether the subject is a person. According to an embodiment, if the subject is the person, the processor 510 may identify whether it is a user registered in the electronic device 500 through facial recognition.

The audio processing unit 560 (e.g., the input/output interface 150 of the electronic device 101 of FIG. 1, the audio module 280 of the electronic device 201 of FIG. 2) may output or receive an audio signal. For example, the audio processing unit 560 may output an audio signal through a speaker (SPK), and receive an audio signal through a microphone (MIC).

According to one embodiment of the present disclosure, if recognizing the user's presence through the environment sensor 571, the audio processing unit 560 may turn on the microphone in order to re-recognize the presence or the absence of the user. For example, if an audio signal corresponding to the voice is inputted or an audio signal corresponding to the foot step is inputted through the microphone, the processor 510 may recognize that the user is present. According to an embodiment, if a voice signal is inputted, the processor 510 may identify whether it is a user registered in the electronic device 500 through speech recognition.

The sensor unit 570 (e.g., the sensor module 240 of the electronic device 201 of FIG. 2) may include various sensors. For example, the sensor unit 570 may include an environment sensor 571, an optical sensor 572, a grip sensor 573, and a motion sensor 574.

The environment sensor 571 may collect environment information. The environment sensor 571 may include a temperature sensor, a humidity sensor, a wind speed sensor, an odour sensor, a gas sensor, or the like. The environment sensor 571 may be turned on if it identified that the electronic device 500 is not in use, and collect the environment information at designated intervals. The collected environment information may be used by the processor 510 to identify whether the user is present or not. For example, the processor 510 may recognize that the user approaches if the temperature is lowered and recovers. This utilizes a phenomenon that the temperature is lowered and recovers by air flow caused by the user's movement at about 25° C. which is a normal air temperature.

According to an embodiment, the processor 510 may recognize that the user approaches if the humidity increases. This utilizes a phenomenon that the humidity is measured below relative humidity 70% (relative humidity 30%~60% of ISO standard comfort zone) which is a normal indoor humidity level and, if the user approaches, increases due to vapor contained in exhalation having relative humidity 100%.

According to an embodiment, if detecting gas components contained in the exhalation, the processor 510 may recognize that the user approaches. For example, the processor 510 may measure a concentration change of carbon dioxide through a gas sensor, and recognize that the user approaches if the concentration of the carbon dioxide increases.

According to an embodiment, the processor 510 may recognize that the user approaches if detecting volatile organic compounds (VOC) mixed gas, metabolic gas such as acetone, ethanol, benzene, isoprene, carbon monoxide and the like, or gas associated with bad breath such as volatile sulfur compounds (VSC), volatile nitrogen compounds (VNC), volatile fatty acids (VFA), and aldehyde series which are measured in the exhalation through the gas sensor.

According to an embodiment, the processor 510 may recognize whether the user approaches using odour and dust concentrations of user's clothes, cosmetics, perfumes, body odour from sweat which are measured by an odour sensor and a dust sensor. For example, the processor 510 may analyze and record clothes, cosmetics, perfumes, and body odour from the sweat before the user is absent, and release the absence mode (enter the use ready mode) by recognizing the user approach if the environment information measured by the odour sensor and the dust sensor matches environment information recorded previously. According to an embodiment, the processor 510 may record a ratio of a core gas included in a body odour of the user through machine learning, and identify whether the user is registered in the electronic device by comparing measured information (e.g., gas ratio) with recorded information (gas ratio).

According to an embodiment, the processor 510 may recognize the user approach if detecting wind generated by a user's motion or convection and diffusion due to a concentration difference between the body temperature, humidity, and gas of a person through the wind speed sensor. For example, the processor 510 may recognize whether the user is present nearby by measuring the change of the air flow occurring if the user appears nearby. In this case, the processor may recognize the user's proximity by continuously or periodically monitoring the flow of air so as not to recognize the air flow generated by heating, ventilation and air conditioning (HVAC) as the user proximity.

The optical sensor 572 may include an illuminance sensor, an infrared sensor, a proximity sensor, a gesture sensor, a biometric sensor (e.g., a heart rate sensor, an iris sensor), and so on. The optical sensor 572 may be used to recognize the presence or the absence of the user. For example, if illuminance recognized by the illuminance sensor is lowered, the processor 510 may recognize that the light is blocked by the user. The processor 510 may recognize that the user is present if detecting a subject through the infrared sensor. The processor 510 may recognize that the user is present if detecting the user's motion through the gesture sensor. The processor 510 may recognize that the user is present if detecting a user's biometric signal through the biometric sensor.

The grip sensor 573 may detect whether the user grips the electronic device 500. If determining the grip state through the grip sensor 573, the processor 510 may terminate collecting the environment information.

The motion sensor 574 may detect the movement of the electronic device 500. The motion sensor 574 may include an acceleration sensor, a geomagnetic sensor, a gravity sensor, or the like. If determining that the electronic device 500 is moving through the motion sensor 574, the processor 510 may terminate collecting the environment information.

The power management unit 580 (e.g., the power management module 295 of the electronic device 201 of FIG. 2) may supply or block the power to the components of the electronic device 500. For example, the power management unit 580 may block the power of any configuration excluding the configuration (e.g., the environment sensor 571, the processor 510) for collecting the environment information in the absence mode. If the absence mode is released, the power management unit 580 may notify an alarm and supply the power to the configurations for restoring a background application.

While the sensor unit 570 is connected to the processor 510 in FIG. 5, embodiments of the present disclosure are limited to this. For example, the electronic device 500 may separately include a sensor hub (e.g., a low power processor) having less power consumption than the processor 510, and may connect the sensor unit 570 with the sensor hub. In another embodiment, the sensor hub may be included in the processor 510. In yet another embodiment, the processor 510 may be driven in the normal mode and the low power mode, and the processor 510 may be driven in the low power mode in the absence mode. Thus, various embodiments of the present disclosure may further reduce the current consumption by operating only the environment sensor and the low power processor in the absence mode.

Meanwhile, although not shown in FIG. 5, the electronic device 500 may not include some of the components described. In another embodiment, the electronic device 500 may further include at least one other component (e.g., a digital broadcasting module, a fingerprint scanning sensor, an interface module, an input device, a battery, etc.) of the equivalent level to the described components.

According to various embodiments, an electronic device (e.g., the electronic device 101 of FIG. 1, the electronic device 201 of FIG. 2, the electronic device 400 of FIG. 4, the electronic device 500 of FIG. 5) may include at least one environment sensor (e.g., the environment sensor 571 of FIG. 5); and at least one processor (e.g., the processor 120 of the electronic device 101 of FIG. 1, the processor 210 of the electronic device 201 of FIG. 2, the processor 510 of the electronic device 500 of FIG. 5) functionally coupled to the at least one environment sensor and configured to control the at least one environment sensor to collect environment information at designated intervals, to recognize presence or absence of a user based on the collected environment information, and to control an operation of the electronic device according to the presence or absence of the user.

According to various embodiments, the at least one environment sensor may include at least one of a temperature sensor, a humidity sensor, a wind speed sensor, an odour sensor, and a gas sensor.

According to various embodiments, the processor may be configured to recognize the presence or absence of the user by at least once identifying whether a difference of environment information collected at a previous interval and environment information collected currently exceeds a preset first threshold, or by at least once identifying whether the environment information collected currently exceeds a preset second threshold.

According to various embodiments, the first threshold and the second threshold may vary according to environment information of a place where the electronic device is located.

According to various embodiments, the processor may, if the user is present near the electronic device, enter a use ready mode, and if the user is not present near the electronic device, enter an absence mode which controls at least one of power and functions of at least some of components of the electronic device.

According to various embodiments, the processor may identify whether the electronic device is in use, and determine that the user is present near the electronic device if identify the use.

According to various embodiments, the processor may determine the use if a display is turned on, a touch input is detected, an audio playback function is running, the electronic device is gripped, or movement of the electronic device is detected.

According to various embodiments, the processor may identify whether there is at least one other electronic device associated with the electronic device by wire or wirelessly, and if there is the other electronic device, enter a quasi absence mode which maintains a function associated with the other electronic device and terminates other function.

According to various embodiments, the electronic device may further include at least one of an optical sensor, an image sensor, and a microphone, for recognizing the presence or absence of the user, wherein, if recognizing the user presence through the environment sensor, the processor may control to re-recognize the presence or absence of the user through at least one of the optical sensor, the image sensor, and the microphone.

According to various embodiments, the processor may identify a user of the electronic device by comparing current user information recognized through at least one of voice recognition, facial recognition, and biometric information recognition with user information pre-registered in the electronic device, or identify the user of the electronic device by comparing odour information collected and stored when a registered user is located nearby with current odour information.

Figure 6A:
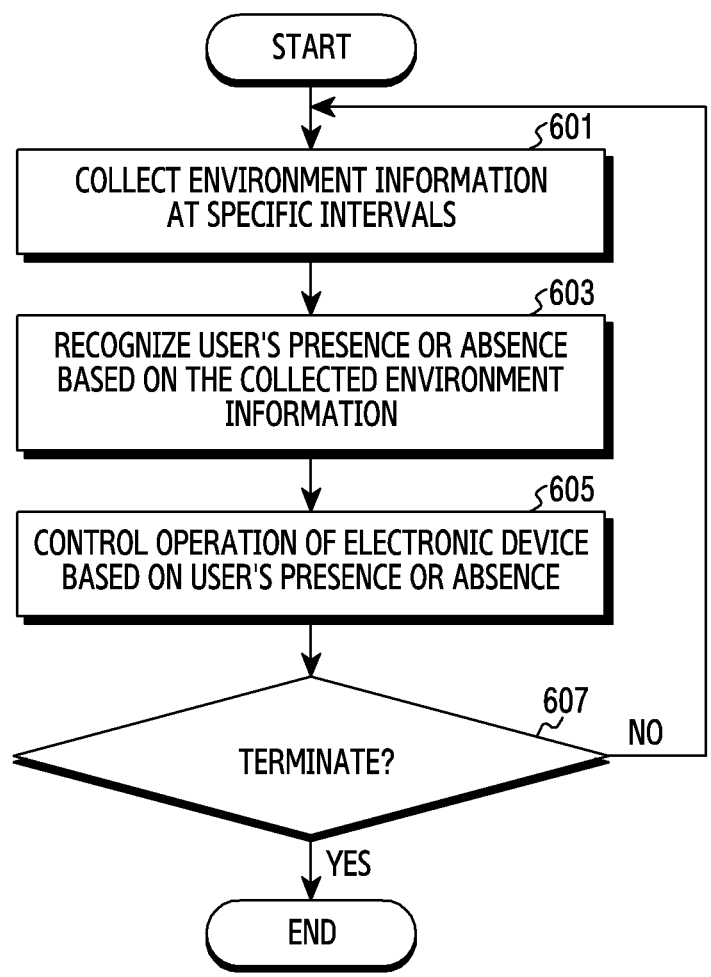
FIG. 6A is a flowchart for illustrating a method for controlling operations of an electronic device based on an environment sensor according to one embodiment of the present disclosure.
Figure 6B:
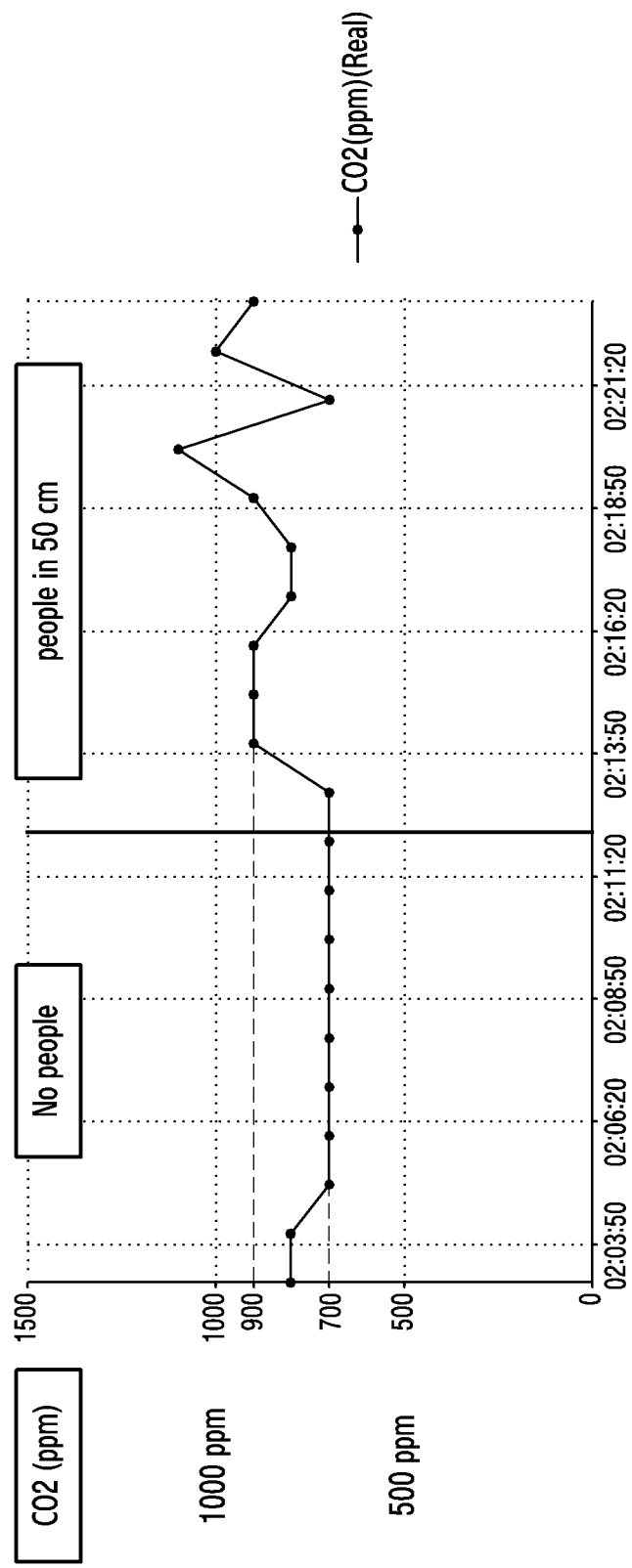
FIG. 6B is a diagram for illustrating an example of measuring presence or absence of a user by use of a gas sensor according to one embodiment of the present disclosure.
Figure 6C:
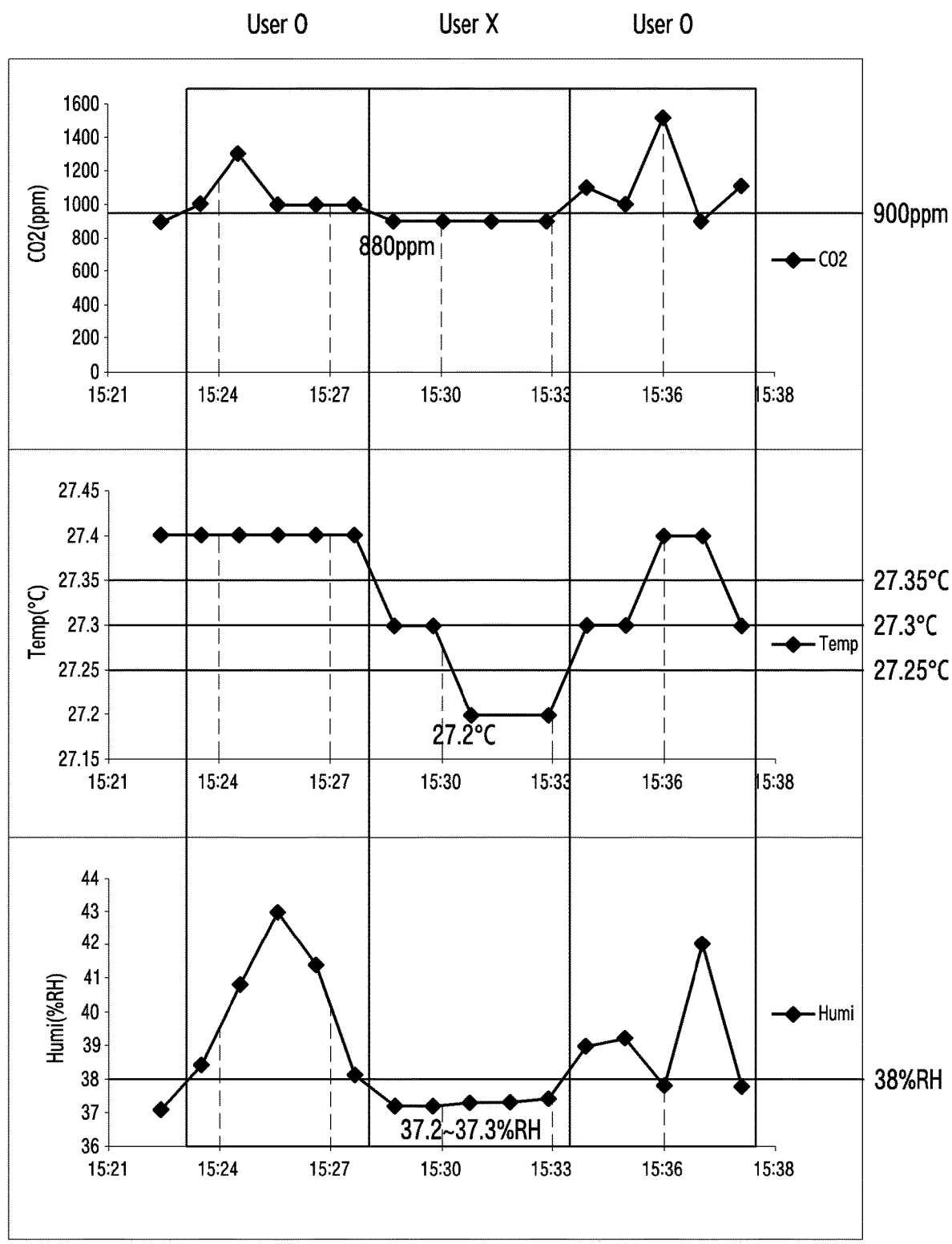
FIG. 6C is a diagram for illustrating an example of measuring presence or absence of a user by use of a gas sensor, a temperature sensor, and a humidity sensor according to one embodiment of the present disclosure.

FIG. 6A is a flowchart for illustrating a method for controlling operations of an electronic device based on an environment sensor according to one embodiment of the present disclosure, FIG. 6b is a diagram for illustrating an example of measuring presence or absence of a user by use of a gas sensor according to one embodiment of the present disclosure, and FIG. 6C is a diagram for illustrating an example of measuring presence or absence of a user by use of a gas sensor, a temperature sensor, and a humidity sensor according to one embodiment of the present disclosure.

Referring to FIG. 6A and FIG. 6C, according to various embodiments of the present disclosure, in operation 601, the electronic device (e.g., the processor 120 of the electronic device 101, the processor 210 of the electronic device 201, or the processor 510 of the electronic device 500) may collect environment information at designated intervals (e.g., one minute or one second). For example, the electronic device may collect at least one environment information through at least one environment sensor. The electronic device may set an initial value measured by the environment sensor as a reference value. If requiring stabilization, the environment sensor may be stabilized and then set the measured value as the reference value. According to an embodiment, the electronic device may set the reference value by compensating for the measured value before the stabilization of the environment sensor is completed.

In operation 603, the electronic device may recognize presence or absence of the user based on the collected environment information. For example, the electronic device may recognize the absence of the user if a difference (a change) of the reference value and a second environment information value measured exceeds (or is equal to or greater than) a preset first threshold or if the second environment information value measured falls below (or is equal to or less than) a preset second threshold. By contrast, the electronic device may recognize the presence of the user if the difference of the reference value and the second environment information value measured falls below (or is equal to or less than) a preset third threshold and the second environment information value falls within a set range or the second environment information value measured exceeds (or is equal to or greater than) a preset fourth threshold and falls within the set range. The first threshold and the third threshold may have the same value, and the second threshold and the fourth threshold may have the same value. In another embodiment, the first threshold and the third threshold may be set to different values, and the second threshold and the fourth threshold may be set to different values. Hence, one embodiment of the present disclosure may strictly set the conditions (the third threshold and the fourth threshold) for determining that the user is present, and loosely set the conditions (the first threshold and the second threshold) for determining that the user is absent. In another embodiment, the first threshold and the third threshold may be set to the same values, and the second threshold and the fourth threshold may be set to different values. In yet another embodiment, the first threshold and the third threshold may be set to different values, and the second threshold and the fourth threshold may be set to the same value.

Meanwhile, the electronic device may recognize the presence or the absence of the user using the environment sensor. For example, the electronic device may recognize that the user is present nearby if a concentration of carbon dioxide measured by a gas sensor increases, and recognize that the user is absent if the concentration of the carbon dioxide decreases. For example, the concentration of the carbon dioxide which was about 700 ppm at "02:11:20" may increase to about 900 ppm at "02:13:50" due to the user's access as shown in FIG. 6B. Here, assuming that the first threshold is set to 100 ppm and the second threshold is set to 800 ppm, the electronic device may recognize the user presence because the change (200=900−700) exceeds the first threshold (100 ppm). In addition, the electronic device may recognize the user presence because the carbon dioxide concentration measured at "02:13:50" exceeds the second threshold "800 ppm".

In another embodiment, the electronic device may recognize the presence or the absence of the user through a change of an ambient temperature measured using a temperature sensor. Yet another embodiment may recognize the presence or the absence of the user through an ambient humidity change measured using a humidity sensor. Still another embodiment may recognize the presence or the absence of the user through an ambient wind speed change measured by a wind speed sensor.

A further embodiment may recognize the presence or the absence of the user using at least two sensors of various environment sensors (e.g., a gas sensor, a temperature sensor, a humidity sensor, and a wind speed sensor) to enhance accuracy. For example, as shown in FIG. 6C, the electronic device may recognize the presence or the absence of the user using a gas sensor, a temperature sensor, and a humidity sensor. In other words, the electronic device may recognize the presence or the absence of the user by determining, in combination, the changes of the carbon dioxide concentration, the temperature and the humidity measured by the gas sensor, the temperature sensor, and the humidity sensor. For example, the electronic device may recognize the presence of the user if the carbon dioxide concentration and an ambient temperature and humidity increase while the ambient temperature is at a normal indoor level, and recognize the absence of the user if the carbon dioxide concentration and the ambient temperature and humidity decrease.

For example, it is assumed that the first threshold for the carbon dioxide concentration is set to 100 ppm, the second and fourth thresholds are set to 900 ppm, the third threshold is set to −100 ppm, a first threshold for the temperature is set to 0.1 degree, a second threshold is set to 27.25 degrees, a third threshold is set to −0.1 degree, a fourth threshold is set to 27.35 degrees, a first threshold for the humidity is set to 0.5% RH, a second and fourth thresholds are set to 38% RH, and a third threshold is set to −0.5% RH.

At 15:28 of FIG. 6C, the concentration of the carbon dioxide may be 1,000 ppm, the temperature may be 27.4 degrees, and the humidity may be 38.1% RH. Meanwhile, at 15:29, the concentration of the carbon dioxide may reduce to 900 ppm (satisfy the first, second, and fourth thresholds), the temperature may reduce to 27.3 degrees Celsius (not satisfy the fourth threshold), and the humidity may reduce to 37.2% RH (satisfy the first, second, and fourth thresholds). In this case, the electronic device may recognize that the user is not present.

Alternatively, at 15:33 of FIG. 6C, the concentration of the carbon dioxide may be 900 ppm, the temperature may be 27.2 degrees, and the humidity may be 37.4% RH. Meanwhile, at 15:34, the concentration of the carbon dioxide may increase to 1100 ppm (satisfy the second, third, and fourth thresholds), the temperature may increase to 27.3 degrees Celsius (not satisfy the second threshold), and the humidity may increase to 39% RH (satisfy the second, third, and fourth thresholds). In this case, the electronic device may recognize that the user is present.

The electronic device according to one embodiment of the present disclosure may minimize malfunction according to utilizing a plurality of environment sensors. For example, in FIG. 6C, if using only the temperature sensor, the electronic device may recognize that the user is not present by satisfying the fourth threshold for the temperature at 15:31, and then recognize that the user is present by satisfying the second threshold for the temperature at 15:36. However, as a result of the recognition using only the temperature sensor may have a difference (delay) of about 2 minutes from the recognition result (15:34) using a plurality of sensors. As another example, if using only the gas sensor, the concentration of the carbon dioxide changes from 1500 ppm to 900 ppm (satisfies the first threshold (100 ppm), satisfies the second and fourth thresholds (900 ppm)) at 15:37 from 15:36, and thus the electronic device may recognize that the user is not present. However, if using a plurality of environment sensors, as the temperature maintains 27.4 degrees (satisfies the fourth threshold) and the humidity increases from 37.8% RH to 42% RH (satisfies the second and fourth thresholds), the electronic device may recognize that the user is present.

According to an embodiment, the electronic device may recognize the presence or the absence of the user through a combination of the difference value of the reference value and the second environment information measured and the second environment information measured.

After recognizing the presence or the absence of the user, the electronic device may change the reference value with the second environment information measured. Similarly, if measuring third environment information, the electronic device may recognize the presence or the absence of the user based on the third environment information measured, and may change the reference value with a value of the third environment information measured.

In operation 601 and operation 603, in a sleep state (mode), the electronic device may collect the environment information and only the configuration (e.g., the environment sensor, the low power processor) for recognizing the presence or the absence of the user may operate.

In operation 605, the electronic device according to one embodiment of the present disclosure may control the operation (or mode) of the electronic device based on the presence or the absence of the user. For example, the electronic device may enter the absence mode if recognizing that the user is not present. Meanwhile, the electronic device may enter the use ready mode if recognizing that the user is present. In operation 605, if requiring to change the operation (or mode) according to recognizing the presence or the absence of the user, the low power processor may wake up a high power processor (e.g., an AP). In another embodiment, if the low power processor is able to control the operation of the electronic device, the low power processor may control the operation (or mode) of the electronic device while maintaining the sleep state without waking up the high power processor (e.g., an AP).

If entering the absence mode, the electronic device may cut off the power supplied to each component, change the mode of the electronic device (e.g., not provide an alarm event or provide only part of it), terminate a running application, terminate an application running in the background, or turn off the AOD. According to an embodiment, the electronic device may perform at least one or more of the above-described operations.

If entering the use ready mode, the electronic device may re-supply the cut power, restore the mode of the electronic device, restore the state of the suspended or terminated applications to a previous state, or turn on the AOD. According to an embodiment, the electronic device may perform at least one or more of the above-described operations.

In operation 607, the electronic device according to one embodiment of the present disclosure may identify whether it is terminated. The termination may turn off the electronic device or turn off the function of controlling the operation using the environment sensor.

If not terminating, the electronic device may repeat the above operations back in operation 601. By contrast, the electronic device which is terminated may terminate the operation control using the environment sensor.

Meanwhile, although not shown in FIG. 6A, the electronic device according to embodiments of the present disclosure may include a menu for recognizing the presence or the absence of the user using the environment information, and turning on/off the function which controls the operation of the electronic device according to the result. In this case, the electronic device may further include, before the operation 601, an operation for identifying whether the function for controlling the operation of the electronic device is turned on.

According to an embodiment, the electronic device may store a setting value (variable) indicating the user's presence or absence. For example, if the user is present, the electronic device may store the setting value as "1". If the user is not present, the electronic device may store the setting value as "0". The electronic device may determine a default value of the setting value to "1". This is because booting of the electronic device is carried out by the user and accordingly it is highly likely that the user is present nearby at the booting. In another embodiment, the default value of the setting value may be determined by a value which is set and stored by the user in advance. In yet another embodiment, the default value of the setting value may be determined using the initial value measured by the environment sensor.

According to an embodiment, the default value of the setting value may be determined by determining whether or not the electronic device is used. If recognizing movement through an inertial sensor (e.g., an acceleration sensor, a geomagnetic sensor, etc.), if recognizing wired and/or wireless connection with at least one other electronic device, the electronic device may determine the default value of the setting value to "1".

According to an embodiment, the electronic device may identify the presence or the absence of the user through an optical sensor (an infrared sensor, an illuminance sensor, a proximity sensor, a gesture sensor, a biometric sensor (e.g., a heart rate sensor, an iris sensor), etc.), an image sensor (e.g., a camera), and a microphone, and determine the default value of the setting value according to the identifying result.

Figure 7:
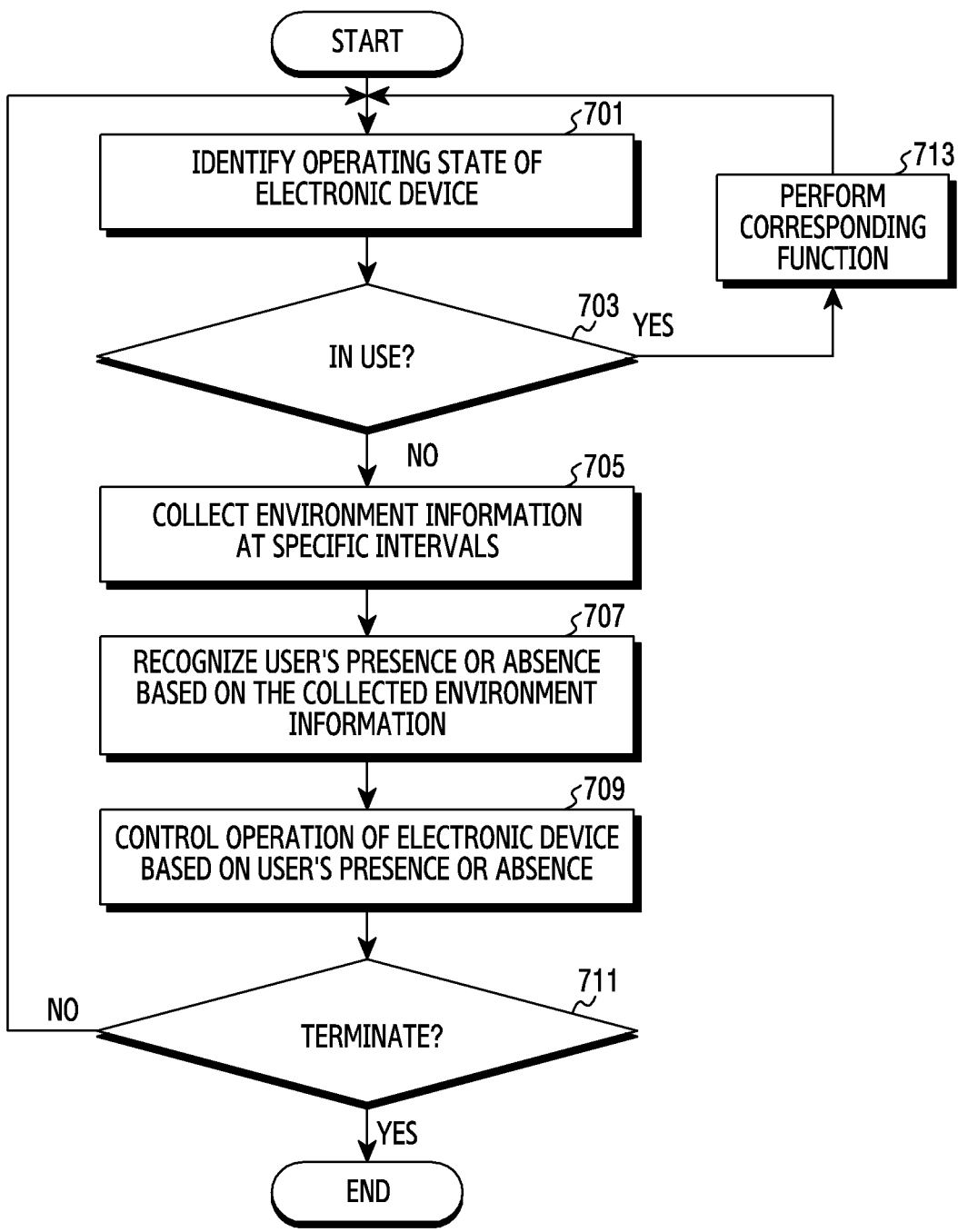
FIG. 7 is a flowchart for illustrating a method for controlling operations of an electronic device based on a status of the electronic device and an environment sensor according to one embodiment of the present disclosure.

FIG. 7 is a flowchart for illustrating a method for controlling an operation of an electronic device based on a status of the electronic device and an environment sensor according to one embodiment of the present disclosure.

Referring to FIG. 7, according to various embodiments of the present disclosure, in operation 701, the electronic device (e.g., the processor 120 of the electronic device 101, the processor 210 of the electronic device 201, or the processor 510 of the electronic device 500) may identify the operating state of the electronic device. For example, the electronic device may identify whether some configuration (e.g., a display, a touch panel, an audio processing unit) is operating, whether the electronic device is moving, or whether the grip is detected.

In operation 703, the electronic device according to one embodiment of the present disclosure may identify whether it is being used. For example, the electronic device may determine the use if some configuration (e.g., a display, a touch panel, an audio processing unit) is operating, if the electronic device is moving, or if the grip is detected.

If determining no use in operation 703, the electronic device may perform operations 705 through 711. The operation 705 through the operation 711 correspond to the operation 601 through the operation 607 of FIG. 6A respectively. Their detailed descriptions will be omitted.

If determining the use in operation 703, in operation 713, the electronic device may perform a corresponding function. For example, the electronic device may change the setting value to indicate the presence of the user, regardless of the determination result on the presence of the user based on the environment information. The electronic device may provide alarm information.

Figure 8:
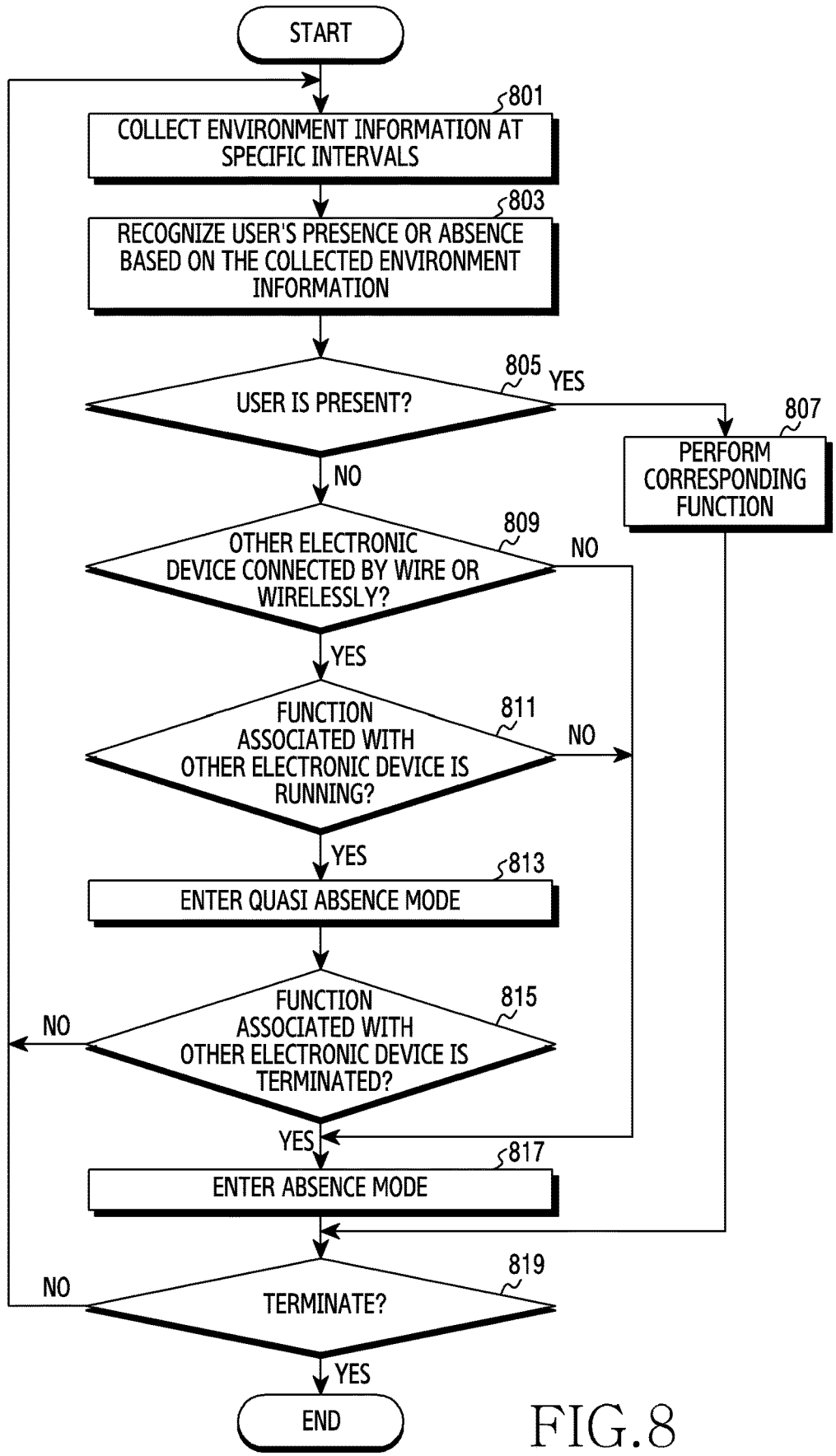
FIG. 8 is a flowchart for illustrating a method for controlling operations of an electronic device in interworking with other electronic device according to one embodiment of the present disclosure.

FIG. 8 is a flowchart for illustrating a method for controlling an operation of an electronic device in interworking with other electronic device according to one embodiment of the present disclosure.

Referring to FIG. 8, in operation 801, the electronic device according to one embodiment of the present disclosure (e.g., the processor 120 of the electronic device 101, the processor 210 of the electronic device 201, or the processor 510 of the electronic device 500) may collect environment information at designated intervals.

In operation 803, the electronic device according to one embodiment of the present disclosure may recognize presence or absence of the user based on the collected environment information.

In operation 805, the electronic device according to one embodiment of the present disclosure may identify whether the user is present. If the user is present in operation 805, the electronic device may perform a corresponding function in operation 807. For example, the electronic device may change to "1" if the setting value is "0", and enter the use ready mode. In another embodiment, the electronic device may maintain the setting value if the set value is "1, and maintain the use ready mode.

If the user is not present in operation 805, the electronic device may identify whether there is other electronic device connected by wire or wirelessly in operation 809. If there is no other electronic device, the electronic device may proceed to operation 817 to be explained. By contrast, if the other electronic device is present, the electronic device may identify whether a function associated with the other electronic device is running in operation 811. For example, the electronic device may identify whether data is transmitted and received to and from the other electronic device.

If the function associated with the other electronic device is not running, the electronic device may proceed to operation 817 to be described. By contrast, if the function associated with the other electronic device is running, the electronic device may enter the quasi absence mode in operation 813. The quasi absence mode is an intermediate stage of the use ready mode and the absence mode, and the electronic device may maintain power supply of a configuration (element, component) for executing the function associated with the other electronic device and the application execution state, cut the power supply of other configurations, and terminate other applications.

For example, if determining that the user is not present while watching a video with a Bluetooth earphone connected, the electronic device may turn off a screen and change other functions operating in the background with the alarm function turned off into a sleep mode.

In another embodiment, if determining that the user is not present while playing media with a wearable electronic device connected through wireless communication such as Bluetooth, Wi-Fi, and so on, the electronic device may stop playing the media, terminate a media playback program after storing the suspended position, and change functions except for the function interworking with the wearable electronic device into the sleep mode.

In another embodiment, if determining that the user is not present while transmitting data to other electronic device connected through a USB or an ear jack, the electronic device may not perform a function which organizes an application running in the background or may change only some function into the sleep mode.

In operation 815, the electronic device according to an embodiment of the present disclosure may identify whether the function associated with the other electronic device is terminated. For example, if the wired or wireless communication connection is disconnected over a specific time, the electronic device may determine that the function associated with the other electronic device is terminated. In another embodiment, if the wired or wireless communication connection is not disconnected but there is no data transmission over a specific time, the electronic device may determine that the connection is not used and thus determine that the function associated with the other electronic device is terminated If the function associated with the other electronic device is not terminated, the electronic device may go to operation 801 to repeat the above-stated operations. By contrast, if the function associated with the other electronic device is terminated, the electronic device may proceed to operation 817 to be described.

In operation 817, the electronic device according to one embodiment of the present disclosure may enter the absence mode. For example, the electronic device may block the power of all configurations excluding the configuration for collecting environment information.

In operation 819, the electronic device according to one embodiment of the present disclosure may identify whether it is terminated. The termination may turn off the electronic device or turn off of a function for controlling the operation using the environment sensor.

If not being terminated, the electronic device may return to operation 801 to repeat the above-described operations. By contrast, the electronic device which is terminated may terminate the operation control using the environment sensor.

Figure 9A:
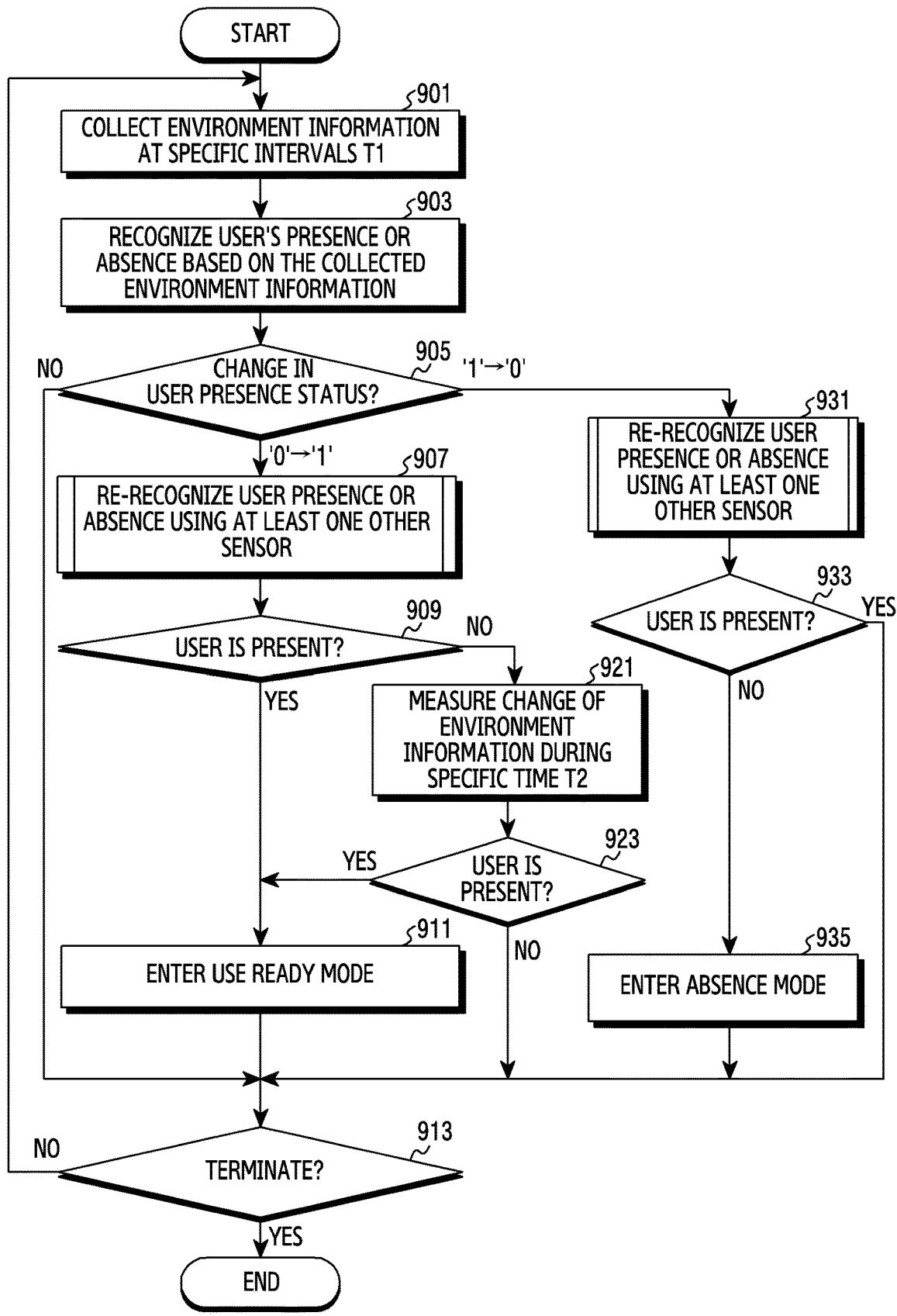
FIG. 9A is a flowchart for illustrating a method for controlling operations of an electronic device based on an environment sensor and other sensor capable of recognizing presence of a user according to one embodiment of the present disclosure.
Figure 9B:
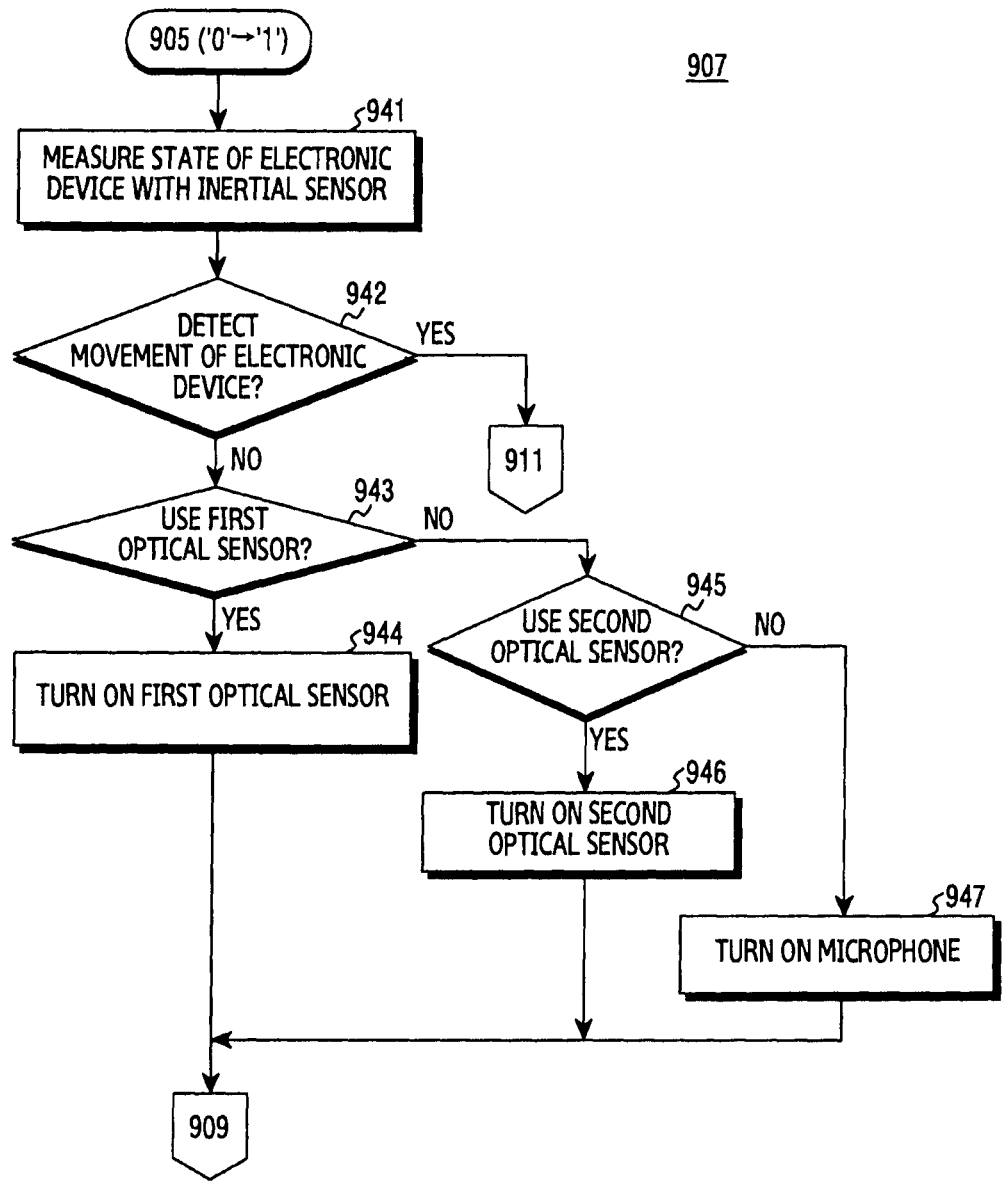
FIG. 9B and FIG. 9C are flowcharts for illustrating a method for re-recognizing presence of a user according to one embodiment of the present disclosure.
Figure 9C:
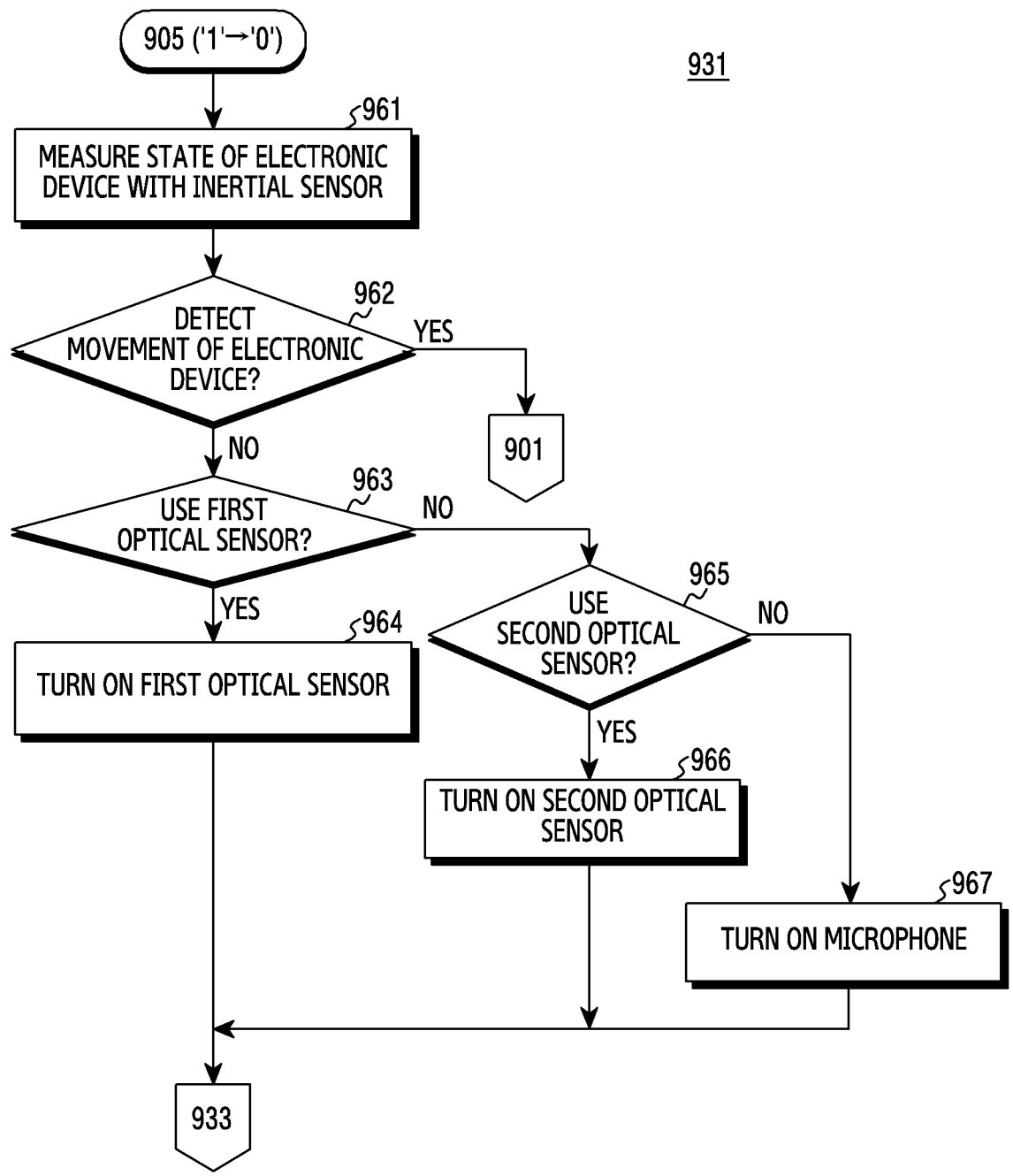

FIG. 9A is a flowchart for illustrating a method for controlling an operation of an electronic device based on an environment sensor and other sensor capable of recognizing presence of a user according to one embodiment of the present disclosure, and FIG. 9B and FIG. 9C are flowcharts for illustrating a method for re-recognizing presence of a user according to one embodiment of the present disclosure.

Referring to FIG. 9A through FIG. 9C, in operation 901, the electronic device (e.g., the processor 120 of the electronic device 101, the processor 210 of the electronic device 201, or the processor 510 of the electronic device 500)

according to one embodiment of the present disclosure may collect environment information at designated intervals t1.

In operation 903, the electronic device according to one embodiment of the present disclosure may recognize presence or absence of the user based on the collected environment information.

In operation 905, the electronic device according to one embodiment of the present disclosure may identify whether a change in the presence status of the user is detected. If not detecting the change in the presence status of the user, the electronic device may proceed to operation 913, which will be described later.

If the presence status of the user is changed from the absence to the presence according to the identifying result of the operation 905, the electronic device may re-recognize the presence or the absence of the user using at least one other sensor capable of recognizing the presence of the user in operation 907. For example, the electronic device may re-recognize the presence or the absence of the user through an optical sensor (a proximity sensor, a gesture sensor, a heart rate sensor, an infrared sensor, etc.), an image sensor (camera), or a microphone.

As for the re-recognition procedure in reference to FIG. 9B, the electronic device according to one embodiment of the present disclosure may measure the state of the electronic device using the inertial sensor, in operation 941. For example, the electronic device may identify whether the electronic device is moving using an acceleration sensor and a gyro sensor, or identify an angle state for detecting a user's motion using the optical sensor.

In operation 942, the electronic device according to one embodiment of the present disclosure may identify whether movement of the electronic device is detected over a specific time (e.g., 5 seconds) based on the measurement result. If detecting the movement of the electronic device over the specific time according to the identifying result, the electronic device may proceed to operation 911 of FIG. 9A. By contrast, if not detecting the movement of the electronic device over the specific time according to the identifying result, the electronic device may identify whether to use a first optical sensor in operation 943. For example, the electronic device may identify whether the front side of the electronic device faces upwards. For example, the electronic device may identify whether it has the angle between 90 degrees and 135 degrees based on a user's standing direction. The first optical sensor may be disposed in the front side of the electronic device, and may include at least one of an illuminance sensor, a gesture sensor, a proximity sensor, and a front face camera. If using the first optical sensor according to the identifying result of the operation 943, the electronic device may turn on the first optical sensor in operation 944 and proceed to operation 909 to be described. As above, if not detecting the movement of the electronic device through the inertial sensor, the electronic device may obtain the angle state, and if the front side faces upwards, re-recognize whether the user is present or not using the optical sensor or an image sensor disposed in the front side.

If not using the first optical sensor according to the identifying result of the operation 943, the electronic device may identify whether to use a second optical sensor in operation 945. For example, the electronic device may identify whether the back side of the electronic device faces upwards. For example, the electronic device may identify whether it has the angle between 225 degrees and 270 degrees based on the user's standing direction. The second optical sensor may be disposed in the back side of the electronic device, and may include at least one of a biometric sensor (e.g., a heart rate sensor), an infrared sensor, an RGP sensor, and a back face camera. If using the second optical sensor according to the identifying result of the operation 945, the electronic device may turn on the second optical sensor in operation 946 and proceed to operation 909 to be described. As above, if the back side of the electronic device faces upwards, the electronic device may re-recognize whether or not the user is present using the optical sensor or an image sensor disposed in the back side.

If not using the second optical sensor according to the identifying result of the operation 945, the electronic device may turn on the microphone in operation 947 and proceed to operation 909 to be explained.

As such, if the electronic device has the angle where a person in proximity is not determined, for example, if the electronic device may not determine the movement with the optical sensor or the image sensor, the electronic device may re-recognize whether the user is present or not using the microphone.

While it is illustrated that, if not using the first optical sensor and the second optical sensor, the presence or the absence of the user is re-recognized using the microphone in FIG. 9B, according to an embodiment, the presence or the absence of the user may be re-recognized by combining the first or second optical sensor and the microphone.

In operation 909, the electronic device according to one embodiment of the present disclosure may identify whether the user is present, based on the re-recognizing result of the operation 907. For example, if ambient light brightness from the first or second optical sensor changes over a specific level, or if the image sensor of the array type such as a camera detects a motion, the electronic device may recognize the presence of the user in vicinity. In another embodiment, if a size of a moving object is inferred using a distance value from two or more sensors or a sensor capable of recognizing a distance to the moving object and an angle of the inertial sensor and corresponds to a size of a person or is determined as a similar size to an inputted user's height, the electronic device may recognize the presence of the user in the vicinity. In yet another embodiment, the electronic device may identify whether the user is registered in the electronic device through facial recognition.

If detecting increase of footstep sound or recognizing the user's voice from the microphone, the electronic device may recognize that the user is present in the vicinity. In another embodiment, if determining that the voice inputted through the microphone and a voice pre-registered as the user of the electronic device (the voice registered by the user, or registered automatically by recognizing call voice) match (or are similar), the electronic device may recognize that the registered user is present in the vicinity.

If the user is present according to the identifying result of the operation 909, the electronic device may enter the use ready mode in operation 911. For example, the electronic device may enter the use ready mode according to recognizing the user presence in both of the recognition result using the environment sensor and the re-recognition result using at least one other sensor. The electronic device, upon entering the use ready mode, may determine a situation where the user may see the electronic device at a short range, and output missed call, text, schedule, SNS, the number of messages, and summary information without manipulating the electronic device.

If the user is not present according to the identifying result of the operation 909, the electronic device may measure a change of the environment information during a specific time t2 in operation 921. The specific time t2 may be set to few seconds (e.g., 5 through 10 seconds) through tens of seconds (e.g., 30 through 60 seconds).

Based on the measurement result of the operation 921, the electronic device according to one embodiment of the present disclosure may identify whether the user is present in operation 923. If the user is present according to the identifying result of the operation 923, the electronic device may proceed to the operation 911. For example, the electronic device may determine that the identifying result of the operation 909 is wrong and enter the use ready mode in operation 911. After entering the use ready mode, the electronic device may proceed to operation 913 to be explained. By contrast, if the user is not present according to the identifying result of the operation 921, the electronic device may proceed to the operation 913 to be described.

If the presence status of the user is changed from the presence to the absence according to the identifying result of the operation 905, the electronic device may re-recognize the presence or the absence of the user using at least one other sensor capable of recognizing the user's presence in operation 931.

As for the re-recognition procedure in reference to FIG. 9C, the electronic device according to one embodiment of the present disclosure may measure the state of the electronic device using the inertial sensor in operation in 961. For example, the electronic device may identify whether the electronic device is moving using an acceleration sensor and a gyro sensor, or whether it is an angle state for detecting a user's motion using an optical sensor.

In operation 962, the electronic device according to one embodiment of the present disclosure may identify whether movement of the electronic device is detected over a specific time (e.g., 5 seconds) based on the measurement result. According to the identifying result, if detecting the movement of the electronic device over the specific time, the electronic device may proceed to operation 901 of FIG. 9A. By contrast, according to the identifying result, if not detecting the movement of the electronic device over the specific time, the electronic device may identify whether to use the first optical sensor in operation 963.

According to the identifying result of the operation 963, if using the first optical sensor, the electronic device may turn on the first optical sensor in operation 964 and proceed to operation 933 to be described.

According to the identifying result of the operation 963, if not using the first optical sensor, the electronic device may identify whether to use the second optical sensor in operation 965.

According to the identifying result of the operation 965, if using the second optical sensor, the electronic device may turn on the second optical sensor in operation 966 and proceed to operation 933 to be described. According to the identifying result of operation 963, if not using the second optical sensor, the electronic device may turn on the microphone in operation 967 and proceed to operation 933 to be explained.

In operation 933, the electronic device according to one embodiment of the present disclosure may identify whether the user is present, based on the re-recognition result of operation 931.

If the user is present according to the identifying result of operation 933, the electronic device may proceed to operation 913, which will be described later. The electronic device may ignore the recognition result of the environment sensor which recognizes that the user is present, process that the user presence is maintained, and proceed to operation 913.

By contrast, if the user is not present according to the identifying result of operation 933, the electronic device may enter the absence mode in operation 935. For example, as recognizing the user absence in both of the recognition result and the re-recognition result, the electronic device may enter the absence mode. If entering the absence mode, the electronic device may merely change the sound/vibration/mute operation (mode), collect missed calls, texts, schedule, SNS, message, and so on in quantity, and perform the operation to arrange contents, without notifying an alarm. In this case, the electronic device may also block the LED notification function.

After entering the absence mode, the electronic device may proceed to operation 913 to be described later.

In operation 913, the electronic device according to one embodiment of the present disclosure may identify whether it is terminated. The termination may turn off the electronic device or turn off the function of controlling the operation using the environment sensor.

If not terminating, the electronic device may repeat the above operations back in operation 901. By contrast, the electronic device which is terminated may end the operation control using the environment sensor.

Meanwhile, while it is described that the alarm information is provided in the use ready mode, various embodiments of the present disclosure are not limited thereto. For example, if identifying the status of the electronic device recognized through the inertial sensor in entering the use ready mode and the user may not see the screen because the back side of the electronic device faces up, the electronic device may notify the user of the notification during the absence through a flash of the back side or the LED such as a heart rate sensor.

In other embodiment, if one of the recognition result and of the re-recognition result recognizes that the user is present and the other recognizes that the user is not present, the electronic device may recognize that the user is at a long distance or is not able to see the electronic device, and provide the alarm information only through the LED.

Figure 10:
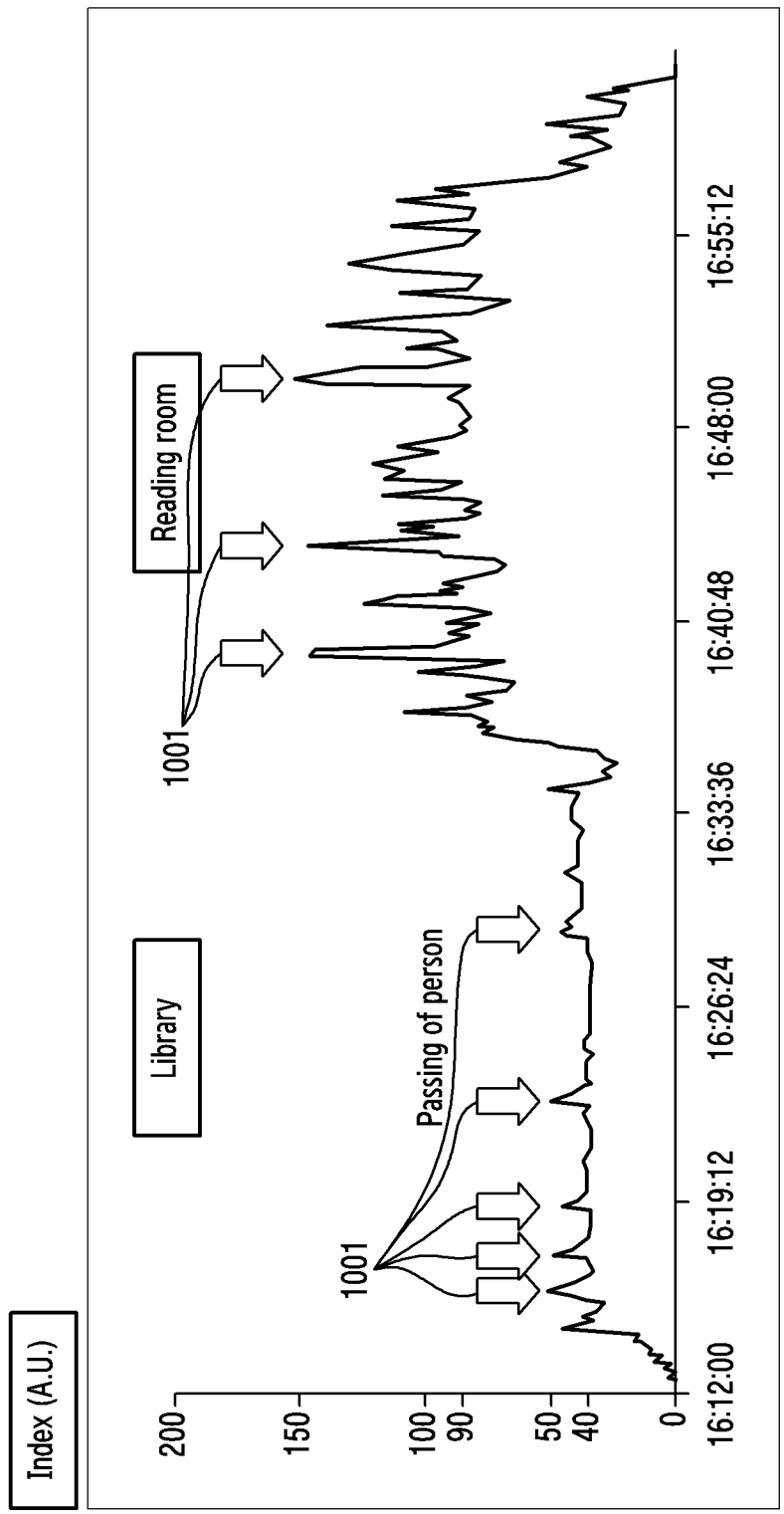
FIG. 10 is a diagram for illustrating a method for controlling operations of an electronic device according to one embodiment of the present disclosure.

FIG. 10 is a diagram for illustrating a method for controlling an operation of an electronic device according to one embodiment of the present disclosure.

Referring to FIG. 10, after detecting a change of the presence state of the user, the electronic device may further carry out the identifying process using the environment sensor at least one more time. As shown in an identification code 1001 of FIG. 10, if a person passes near the electronic device, environment information (e.g., VOC) may instantaneously change. As such, if the electronic device is positioned in an environment where many people pass by, the absence mode and the use ready mode may frequency change. To prevent occurrence of such a problem, the electronic device may perform the re-identifying process at least once through the environment sensor and recognize that the user is present if the environment change is maintained over a specific time.

A threshold for recognizing the presence of the user may vary depending on the place where the electronic device is located. For example, compared with a threshold of a library where users are dispersed, a threshold of a reading room where users are relatively concentrated may be set high. For example, the threshold of the library may be set to about 40 and the threshold of the reading room may be set to 90 as shown in FIG. 10.

In another embodiment, a method for performing the identifying process for multiple times may be used for privacy protection and public etiquette in an environment many people pass by. For example, while the user leaves the vicinity of the electronic device, if public facilities are estimated based on location information acquired through GPS, Wi-Fi, cell, BLE, and so on or information (name) of the facilities or if the value of the environment sensor changes in a short period of time and recovers multiple times, the electronic device may enhance the entry to the absence mode and the entry to the use ready mode.

The electronic device may lower the sound and the vibration intensity in the normal absence mode, and may further lower the voice and the vibration intensity or switch to the mute mode in the enhanced absence mode. In another embodiment, the electronic device may change the sound to the vibrations in the normal absence mode, and switch the sound to the mute in the enhanced absence mode.

If the setting value indicating the user's presence occurs over a specific number of times during a specific time, the electronic device may enhance the entry to the use ready mode. For example, the electronic device may enter the use ready mode used if recognizing that the user is present over multiple times (e.g., five times) in a row. The presence or the absence of the user may be recognized at intervals of less than one second to several minutes. In this case, the electronic device may determine the presence or the absence of the user by selecting measurement results of the designated intervals, rather than the continuous measurement results.

If the user is away from the vicinity of the electronic device, the electronic device having the environment sensor of the present disclosure as described above may arrange (or terminate) the background application by entering the absence mode and stop operating the AOD. Thus, various embodiments of the present disclosure may minimize current consumption of the electronic device. Next, if the user returns to the vicinity of the electronic device, the electronic device may release the absence mode, enter the use ready mode to automatically execute the arranged (or terminated) background application and to turn on the AOD, and perform notification regarding an event received during the absence.

For example, the user may charge or leave the electronic device on a table. If not detecting movement of the electronic device using the acceleration sensor, the geomagnetic sensor, and so on, the electronic device may determine whether it is placed in a closed place such as a pocket using the illuminance sensor or the image sensor (e.g., a camera) disposed on the front side and the back side of the electronic device. Further, the electronic device may determine which one of the front side or the back side of the electronic device faces upwards by integrating measurement results of the acceleration sensor and the illuminance light sensor or the image sensor.

If not detecting the movement of the electronic device and the closed space such as a pocket, the electronic device may monitor the environment information by periodically turning on the environment sensor such as temperature, humidity, gas, or wind speed sensor. The monitoring may monitor data from a point of determining through the acceleration sensor that the electronic device is terminated to past (e.g., one minute before), or may monitor newly measured data for a specific time (e.g., 30 seconds). The monitoring may indicate determining whether the user is absent.

To determine whether the user intentionally fixes the electronic device and performs a specific operation, the electronic device may identify whether there is another electronic device connected with the short-range wireless communication such as Bluetooth, whether other screen than the AOD is turned on, and whether the operation such as music service or call is conducted. If there is no another electronic device connected with the short-range wireless communication, the screen is turned off, and other operation is not conducted, the electronic device may recognize a not use state.

If the electronic device is not moving and is recognized as the not use state, the electronic device may detect the change of the surrounding environment information using the environment sensor such as temperature, humidity, gas, odour, or wind speed sensor. For example, increase or decrease of the carbon dioxide concentration may be detected as shown in the graph of FIG. 6B. The electronic device may perform determining the absence through the environment sensor only once. According to an embodiment, to increase accuracy of the absence determination, the electronic device may perform determining the absence through the environment sensor more than twice.

According to another embodiment, to increase the accuracy of the absence determination, the electronic device may re-determine the absence using other sensor (e.g., an optical sensor, a microphone, etc.) for detecting the user. For example, it is possible to monitor no movement in vicinity or getting away using the optical sensor (a camera, an illuminance sensor, a proximity sensor, etc), or to monitor decrease of the footstep sound or the voice through the microphone. Determining the absence using the optical sensor or the microphone may be performed once or multiple times.

If only the results of one of the environment sensor and the other sensor determine the user absence, the electronic device may enter the quasi absence mode. For example, the electronic device may identify the angle state recognized by the inertial sensor and/or the illuminance sensor, and if the front side of the electronic device faces up, notify reception of the missed message through the LED disposed in the front side. According to another embodiment, if the back side facing up, the electronic device may notify the reception of the missed message using the flash or the LED which is disposed in the back side.

If the user does not identify the missed message (text or call) over a specific time (e.g., three minutes), the electronic device may enter the absence mode. For example, the electronic device may minimize the current consumption by turning off the running AOD, terminating the background application, and aborting the notification of the missed message. At this time, the electronic device merely stores and organizes the received text, call, schedule and so on, and may not notify the notification.

If the results of the environment sensor and the other sensor determine that the user is absent, the electronic device may immediately operate in the absence mode.

In the quasi absence mode or the absence mode, the electronic device may detect a user's access. For example, the electronic device may detect the user's access through at least one of the environment sensor and the other sensor (e.g., the optical sensor and/or the microphone).

According to an embodiment, if the user is recognized to access and pass by without stopping through the environment sensor and the other sensor and this case is repeated over a specific number of times, the electronic device may increase the number of identifying the user's access and recognize the user access only if identifying that the person is standing in vicinity.

According to an embodiment, if only the results of one of the environment sensor and the other sensor determine the user access, the electronic device may enter the quasi absence mode. For example, the electronic device may turn on the notice notification through the LED and the AOD, and wake up only some of terminated background applications, and may not display the missed call, the text, and the schedule on the screen.

According to another embodiment, if the environment sensor and the other sensor detect the user access, the electronic device may turn on the AOD, without the notice notification through the LED, wake up all of the terminated background applications, and arrange and display the missed call, the text, and the schedule on the screen. In another embodiment, the electronic device may also provide audible and/or tactile notification through sound, vibrations, and so on.

According to various embodiments of the present disclosure, a method for controlling an operation of an electronic device (e.g., the electronic device 101 of FIG. 1, the electronic device 201 of FIG. 2, the electronic device 400 of FIG. 4, the electronic device 500 of FIG. 5) may include collecting environment information at designated intervals; recognizing presence or absence of a user based on the collected environment information; and controlling the operation of the electronic device according to the presence or absence of the user.

According to various embodiments, collecting the environment information may include collecting at least one of a temperature, a humidity, a wind speed, an odour, and a gas.

According to various embodiments, recognizing the presence or the absence of the user based on the environment information may include any one of at least once identifying whether a difference of environment information collected at a previous interval and environment information collected currently exceeds a preset first threshold; or at least once identifying whether the environment information collected currently exceeds a preset second threshold.

According to various embodiments, the first threshold and the second threshold may vary according to environment information of a place where the electronic device is located.

According to various embodiments, controlling the operation of the electronic device may include if the user is present near the electronic device, entering a use ready mode; and if the user is not present near the electronic device, entering an absence mode which terminates at least one of power and functions of at least part of a configuration of the electronic device.

According to various embodiments, the method may further include identifying whether the electronic device is in use, and determining that the user is present near the electronic device if identify the use.

According to various embodiments, identifying whether the electronic device is in use may include at least one of identifying whether a display is turned on; identifying whether a touch input is detected; identifying whether an audio playback function is running; identifying whether the electronic device is gripped; and identifying whether movement of the electronic device is detected.

According to various embodiments, controlling the operation of the electronic device may include identifying whether there is at least one other electronic device associated with the electronic device by wire or wirelessly; and if there is the other electronic device, entering a quasi absence mode which maintains a function associated with the other electronic device and terminates other function.

According to various embodiments, the method may further include, if recognizing the user presence through the environment sensor, re-recognizing the presence or absence of the user through at least one of an optical sensor, an image sensor, and a microphone.

According to various embodiments, recognizing the presence or the absence of the user may include at least one of identifying the user of the electronic device by comparing current user information recognized through at least one of voice recognition, facial recognition, and biometric information recognition with user information pre-registered in the electronic device; and storing odour information collected when a registered user is located nearby, and identifying the user of the electronic device by comparing the stored odour information with current odour information.

The term "module", as used herein, may refer, for example, to a unit including hardware, software, and firmware, or any suitable combination thereof. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include, for example, and without limitation, at least one of a dedicated processor, a CPU, an Application-Specific Integrated Circuit (ASIC) chip, a Field-Programmable Gate Arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction.

The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter.

According to various embodiments, the non-transitory computer readable recording medium may store at least one instruction configured to cause at least one processor, when executed by the at least one processor, to perform at least one operation. The at least one operation may include: collecting environment information at designated intervals; recognizing presence or absence of a user based on the collected environment information; and controlling the operation of the electronic device according to the presence or absence of the user.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

The embodiments disclosed in the present disclosure are suggested for easy explanation and understanding of the disclosed technical features, and are not intended to limit the scope of the present disclosure. Therefore, the scope of the present disclosure should be interpreted as including all changes or modified forms derived based on the technical idea of the present disclosure.

What is claimed is:

1. An electronic device comprising:
   at least one environment sensor;
   a sensor module comprising at least one of an optical sensor, an image sensor, or a microphone; and
   at least one processor functionally coupled to the at least one environment sensor and the sensor module, wherein the at least one processor is configured to:
   control the at least one environment sensor to collect environment information at designated intervals,
   identify whether a user is present within a designated range from the electronic device based on the collected environment information,
   in response to the user being present within the designated range from the electronic device, control the sensor module to re-identify whether the user is present within the designated range, and
   control an operation of the electronic device based on the re-identified result,
   wherein the processor is further configured to:
      in response to the re-identified result that the user is not present within the designated range from the electronic device, identify whether a function associated with at least one other electronic device connected to the electronic device is being executed,
      in response to the function associated with at least one other electronic device is being executed, enter a quasi absence mode which maintains the function associated with at least one other electronic device and terminates other function,
      identify whether the function associated with at least one other electronic device is terminated,
      in response to the function associated with the other electronic device is terminated, enter an absence mode which blocks a power of some of components of the electronic device and/or inactivates some of functions of the electronic device.

2. The electronic device of claim 1, wherein the at least one environment sensor comprises at least one of a temperature sensor, a humidity sensor, a wind speed sensor, an odor sensor, and a gas sensor.

3. The electronic device of claim 2, wherein the processor is further configured to identify whether the user is present within the designated range by at least once identifying whether a difference of environment information collected at a previous interval and environment information collected currently exceeds a preset first threshold, or by at least once identifying whether the environment information collected currently exceeds a preset second threshold.

4. The electronic device of claim 3, wherein the first threshold and the second threshold vary according to environment information of a place where the electronic device is located.

5. The electronic device of claim 1, wherein the processor is further configured to:
   in response to the re-identified result that the user is present within the designated range from the electronic device, enter a use ready mode.

6. The electronic device of claim 1, wherein the processor is further configured to identify whether the electronic device is in use, and determines that the user is present within the designated range from the electronic device if identify the use.

7. The electronic device of claim 6, wherein the processor is further configured to determine the use if a display is turned on, a touch input is detected, an audio playback function is running, the electronic device is gripped, or movement of the electronic device is detected.

8. The electronic device of claim 1, wherein the processor is further configured to identify whether the user is present within the designated range from the electronic device by comparing current user information recognized through at least one of voice recognition, facial recognition, and biometric information recognition with user information pre-registered in the electronic device, or identify whether the user is present within the designated range from the electronic device by comparing odor information collected and stored when a registered user is located nearby with current odor information.

9. A method for controlling an operation of an electronic device, comprising:
   collecting, using at least one environment sensor, environment information at designated intervals;
   identifying whether a user is present within a designated range from the electronic device based on the collected environment information;
   in response to the user being present within the designated range from the electronic device, re-identifying whether the user is present within the designated range using a sensor module comprising at least one of an optical sensor, an image sensor, or a microphone; and
   controlling the operation of the electronic device based on the re-identified result,
   wherein controlling the operation of the electronic device comprises:
      in response to the re-identified result that the user is not present within the designated range from the electronic device,
      identifying whether a function associated with at least one other electronic device connected to the electronic device is being executed,
      in response to the function associated with at least one other electronic device is being executed, entering a quasi absence mode which maintains the function associated with at least one other electronic device and terminates other function, and
      identifying whether the function associated with at least one other electronic device is terminated,
      in response to the function associated with the other electronic device is terminated, entering an absence mode which blocks a power of some of components of the electronic device and/or inactivates some of functions of the electronic device.

10. The method of claim 9, wherein collecting the environment information comprises:
    collecting at least one of a temperature, a humidity, a wind speed, an odor, and a gas.

11. The method of claim 9, wherein identifying whether the user is present within the designated range from the electronic device based on the environment information comprises any one of:
    at least once identifying whether a difference of environment information collected at a previous interval and environment information collected currently exceeds a preset first threshold; or
    at least once identifying whether the environment information collected currently exceeds a preset second threshold.

12. The method of claim 11, wherein the first threshold and the second threshold are varied according to environment information of a place where the electronic device is located.

13. The method of claim 9, wherein controlling the operation of the electronic device comprises:
- in response to the re-identified result that the user is present within the designated range from the electronic device, entering a use ready mode.

14. The method of claim 9, wherein identifying whether the user is present within the designated range from the electronic device comprises at least one of:
- identifying whether the user is present within the designated range from the electronic device by comparing current user information recognized through at least one of voice recognition, facial recognition, and biometric information recognition with user information pre-registered in the electronic device; and
- storing odor information collected when a registered user is located nearby, and identifying whether the user is present within the designated range from the electronic device by comparing the stored odor information with current odor information.

15. The method of claim 9, further comprising:
- identifying whether the electronic device is in use; and
- determining that the user is present within the designated range from the electronic device if identify the use.

16. The method of claim 15, wherein identifying whether the electronic device is in use comprises at least one of:
- identifying whether a display is turned on;
- identifying whether a touch input is detected;
- identifying whether an audio playback function is running;
- identifying whether the electronic device is gripped; and
- identifying whether movement of the electronic device is detected.

* * * * *